(12) United States Patent
Yoshimura

(10) Patent No.: US 8,379,111 B2
(45) Date of Patent: Feb. 19, 2013

(54) IMAGE PROCESSING DEVICE, IMAGE PROCESSING METHOD RECORDING MEDIUM, AND PROGRAM

(75) Inventor: Shinichi Yoshimura, Tokyo (JP)

(73) Assignee: Sony Corporation, Tokyo (JP)

( * ) Notice: Subject to any disclaimer, the term of this patent is extended or adjusted under 35 U.S.C. 154(b) by 13 days.

(21) Appl. No.: 12/801,776

(22) Filed: Jun. 24, 2010

(65) Prior Publication Data

US 2011/0001846 A1 Jan. 6, 2011

Related U.S. Application Data

(62) Division of application No. 11/812,168, filed on Jun. 15, 2007, now Pat. No. 7,791,662.

(30) Foreign Application Priority Data

Jun. 16, 2006 (JP) ................ P2006-166929

(51) Int. Cl.
*H04N 5/262* (2006.01)
*G06K 9/40* (2006.01)
*G06K 9/36* (2006.01)

(52) U.S. Cl. ............... 348/239; 382/254; 382/276
(58) Field of Classification Search ............ 382/254, 382/266, 275, 276, 289, 295, 308; 348/230.1, 348/231.6, 239
See application file for complete search history.

(56) References Cited

U.S. PATENT DOCUMENTS

| | | | | |
|---|---|---|---|---|
| 4,908,874 A * | 3/1990 | Gabriel | ............... | 382/277 |
| 5,589,880 A | 12/1996 | Tsukui | | |
| 6,069,670 A * | 5/2000 | Borer | ............... | 348/620 |
| 6,963,365 B2 * | 11/2005 | Baron | ............... | 348/239 |
| 8,023,009 B2 * | 9/2011 | Cho | ............... | 348/241 |
| 2004/0130757 A1 | 7/2004 | Mabuchi | | |
| 2004/0184527 A1 * | 9/2004 | Yoneda | ............... | 375/240.01 |
| 2005/0040485 A1 | 2/2005 | Kawahito | | |
| 2005/0190274 A1 | 9/2005 | Yoshikawa et al. | | |
| 2005/0213847 A1 * | 9/2005 | Takane | ............... | 382/275 |

FOREIGN PATENT DOCUMENTS

| | | |
|---|---|---|
| JP | 2004-140149 | 5/2004 |
| JP | 2004-140479 | 5/2004 |
| JP | 2005-65074 | 3/2005 |
| JP | 2005-341382 | 12/2005 |
| JP | 2006-58945 | 3/2006 |

* cited by examiner

*Primary Examiner* — Lin Ye
*Assistant Examiner* — Euel Cowan
(74) *Attorney, Agent, or Firm* — Finnegan, Henderson, Farabow, Garrett & Dunner, L.L.P.

(57) ABSTRACT

An image acquisition unit acquires multiple image data sets of pixels in array, having subject distortion due to focal plane shutter effects, corresponding to images taken at continuous exposure timings; a coefficient storage unit stores coefficients, determined by which number-in-order of multiple images that the image data set corresponds to, and by each pixel position in the image; a multiplying unit multiplies a pixel value of a predetermined pixel in the image data sets, by the coefficient stored in the coefficient storage means; and an adding unit adds each pixel value of a predetermined number of the image data sets. The coefficients include a coefficient wherein, at the earliest image data set, pixels exposed earlier are weighted less and pixels exposed later are weighted more, and a coefficient wherein, at the latest image data set, pixels exposed earlier are weighted more and pixels exposed later are weighted less.

5 Claims, 28 Drawing Sheets

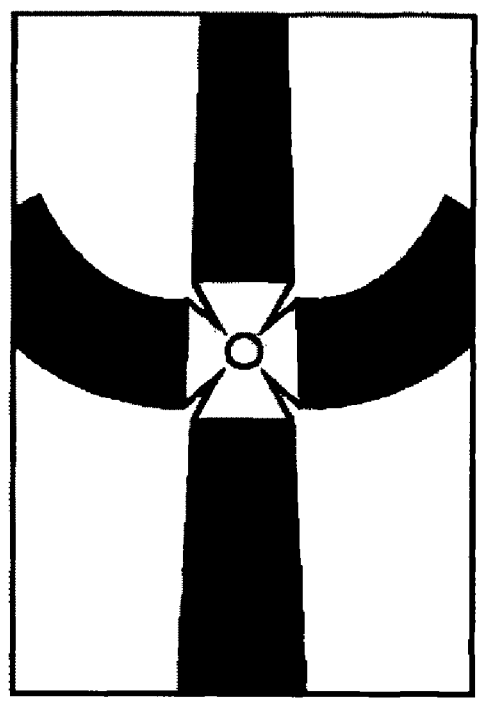
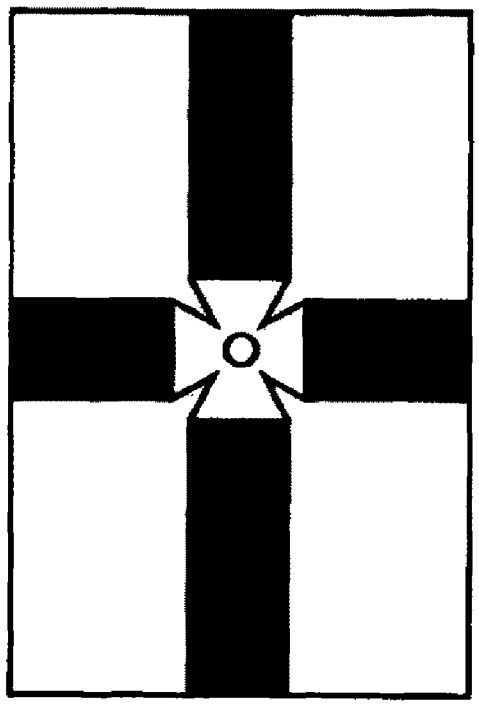

IMAGE PROCESSING DEVICE, IMAGE PROCESSING METHOD RECORDING MEDIUM, AND PROGRAM

CROSS REFERENCES TO RELATED APPLICATIONS

This application is a division of application Ser. No. 11/812,168, filed on Jun. 15, 2007 now U.S. Pat. No. 7,791, 662, which claims the benefit of priority from prior Japanese Patent Application No. JP 2006-066929 filed in the Japanese Patent Office on Jun. 16, 2006, the entire contents of which are incorporated herein by reference.

BACKGROUND OF THE INVENTION

1. Field of the Invention

The present invention relates to an image processing device, an image processing method, a recording medium, and a program, and more particularly relates to an image processing device, an image processing method, a recording medium, and a program, capable of correcting distortion due to focal plane shutter effects in a taken image.

2. Description of the Related Art

The principle of readout from a CCD image sensor 11 will be described with reference to FIGS. 1 through 2C.

The CCD image sensor 11 includes photodiodes 21, vertical CCDs 22, a horizontal CCD 23, and an output amplifier 24.

As shown in FIG. 2A, at the CCD image sensor 11, charges stored in the photodiodes 21 are transferred to the vertical CCDs 22, at the same timing for all pixels. Subsequently, as shown in FIG. 2B, charges are transferred one at a time from all vertical CCDs 22 arrayed horizontally, to the horizontal CCD 23.

Next, as shown in FIG. 2C, these charges for all pixels are transferred in the horizontal direction at the horizontal CCD 23, subjected to signal amplification at the output amplifier 24, and externally output as analog signals.

Then, once again, charges are transferred one at a time vertically from the vertical CCDs 22 to the horizontal CCD 23, following which all charges are transferred in the horizontal direction at the horizontal CCD 23, subjected to signal amplification at the output amplifier 24, and externally output as analog signals. This is repeated until all charges transferred from the photodiodes 21 to the vertical CCDs 22 (i.e., charges for all pixels) have been externally output.

Thus, with a CCD image sensor 11, charges stored in all of the photodiodes 21 are transferred to the vertical CCDs 22 all at once, so the point-in-time at which exposure ends is the same for all pixels, and further, the point-in-time at which exposure is started, i.e., the point-in-time at which light is cast on all photodiodes 21 and photoelectric conversion is started again is the same for all pixels. This is what is known as a "global shutter" operation.

Next, the principle of readout from a CMOS image sensor 41 will be described with reference to FIGS. 3 through 4C.

With a CMOS image sensor 41, charges stored in the photodiodes 21 are output to vertical signal lines 51 in the from of signal currents, via unshown in-pixel amp transistors and transfer transistors. The signal currents are then supplied to a column signal processing units 52, subjected to predetermined signal processing, and then externally output.

The photodiodes 21 corresponding to each pixel vertically arrayed is connected in common to the vertical signal line 51 thereof, so in order to read out the signal from each pixel independently, an arrangement has to be made wherein only one pixel worth of signal is output to the vertical signal line 51 each time.

That is to say, with a CMOS image sensor 41, signals are first read out from each of the photodiodes 21 corresponding to the pixels arrayed at the bottom row (head row) for example, as shown in FIG. 4A, following which the row being read is sequentially changed as shown in FIG. 4B, and finally signals are read out from each of the photodiodes 21 corresponding to the pixels arrayed at the top row (final row), as shown in FIG. 4C, thereby enabling signals for all of the pixels to be read out independently.

At this time, each photodiode 21 starts exposure again immediately following readout of the stored charge, so there is difference in the exposure start point-in-time and the exposure end point-in-time between the photodiode 21 of the head row and the photodiode 21 of the final row. This is a shutter action known as a focal-plane shutter action (or rolling shutter action).

The exposure start timing and the exposure end timing of the photodiodes 21 of each row, and the charge readout start timing, will be described with reference to FIGS. 5 and 6.

FIG. 5 illustrates a case wherein an electronic shutter is not employed, and FIG. 6 illustrates a case wherein an electronic shutter is employed. FIGS. 5 and 6 illustrate the relation between time axis, represented by the horizontal axis, and rows, represented by the vertical axis.

That is to say, since the readout timing of charges from the photodiodes 21 of each row cannot occur concurrently, readout of all pixels of the preceding frame, i.e., readout of the charges of the last row of the preceding frame, must be completed before the exposure time T1 elapses from starting of exposure of the photodiodes 21 of the leading row and reading of charges from the photodiodes 21 of the leading row starts.

For example, as shown in FIG. 5, in the event that no electronic shutter is used, in a case wherein the ending of readout of charge of the N'th frame stored in the photodiodes 21 of the last row (starting exposure of the N+1'th frame) and starting readout of charges of the N+1'th frame stored in the photodiodes 21 of the leading row (ending exposure of the N+1'th frame) occur at consecutive timings, the difference in the timing of starting exposure between the leading row and the last row is minimal, and is approximately equal to the exposure timing T1.

As shown in FIG. 6, in the case of using an electronic shutter, there is an invalid exposure period due to the electronic shutter, so the difference in exposure starting timing between the leading row and the final row is approximately equal to the sum of the exposure period T2 and the invalid exposure period due to the electronic shutter.

In the event of shooting a moving subject, or in the event of the camera itself changing angle (panning) during exposure, image distortion occurs due to exposure time offset due to focal plane shutter operations (or rolling shutter operations). The phenomenon wherein such distortion occurs is known as "focal plane shutter effects" (or "rolling shutter effects").

A specific example of trouble occurring in a taken image due to focal plane shutter effects will be described with reference to FIGS. 7A through 8B.

Let us say that we are shooting an object rotating at high speed with four blades, as a subject. FIG. 7A illustrates an image obtained by shooting with a global shutter operation wherein the exposure timings of all pixels match, such as with a CCD imaging device, and FIG. 7B illustrates an image obtained by shooting with focal plane shutter readout.

We will further say that with the focal plane shutter, the exposure start point-in-time shifts from the top of the taken image toward the bottom thereof, and that the subject is rotating in the counter-clockwise direction.

With the global shutter operations, the exposure timing for capturing the motion of the subject is identical for all pixels, so there may be cases wherein a moving subject appears blurred in the taken image depending on the shutter speed, but the shape of the subject itself can be captured in a true manner.

On the other hand, with the focal plane shutter operation, the exposure start point-in-time shifts in the direction of rotation for portions which move from the right to the left within the screen, so the farther down in the image, the greater the distortion of shape is toward the left. Also, portions which move from the top toward the bottom within the screen match the shift in exposure start point-in-time, so the farther down in the image, the wider the shape appears. For portions which move from the left to the right within the screen, the farther down in the image, the greater the distortion of shape is in the direction of motion, i.e., toward the right. Moreover, portions which move from the bottom toward the tow within the screen move opposite to the shift in exposure start point-in-time, so the farther up in the image, the narrower the shape appears.

Thus, in the event of taking a moving subject with an imaging device performing focal plane shutter operations, the obtained taken image is distorted according to the direction of movement.

Next, in a case of an example wherein the camera is moved (panned horizontally) at the time of taking a still subject, FIG. 8A illustrates an image obtained by shooting with a global shutter operation wherein the exposure timings of all pixels match, and FIG. 8B illustrates an image obtained by shooting with focal plane shutter readout. The situation illustrated here is a case wherein the camera is panned from the left to the right while shooting.

In this case as well, with the global shutter operations, the exposure timing for capturing the motion of the subject is identical for all pixels, so there may be cases wherein a moving subject appears blurred in the taken image depending on the shutter speed, but the shape of the subject itself can be captured in a true manner.

However, with focal plan shutter operations, the shape of the subject appears distorted in the direction of movement of the camera, due to the relation between movement of the camera and the offset in exposure start point-in-time.

Note that with the distortion of the subject due to the focal plane shutter operations described with FIGS. 7A through 8B, the greater the motion of the subject is, and/or the greater the motion of the camera is, the greater the distortion is. Even with a fast shutter speed, distortion will occur in the taken image of the motion of the subject or camera is great.

Accordingly, there has been developed a technique for alleviating image distortion due to focal plane shutter readout with a CMOS image sensor, for example by writing data from the CMOS image sensor to external memory faster than the frame rate and reading the written data out more slowly in accordance with the frame rate, thereby obtaining a taken image equivalent to that of global shutter operations (e.g., see Japanese Unexamined Patent Application Publication No. 2004-140479).

There have also been proposed a technique wherein transistors necessary for global shutter operations are added to the pixels (e.g., see Japanese Unexamined Patent Application Publication No. 2004-140149), a technique wherein capacitors necessary for global shutter operations are (e.g., see Japanese Unexamined Patent Application Publication No. 2004-159555), a technique wherein both transistors and capacitors necessary for global shutter operations are added (e.g., see Japanese Unexamined Patent Application Publication No. 2005-65074), and so forth.

Further, there has been proposed an image processing technique wherein, for example, image distortion obtained by shooting with focal plane shutter operations is corrected by comparison with a registered reference image (e.g., see Japanese Unexamined Patent Application Publication No. 58945).

SUMMARY OF THE INVENTION

However, with the technique described in Japanese Unexamined Patent Application Publication No. 2004-140479, high-speed readout operations so fast that deformation and distortion of subject images become negligible become extremely difficult as the number of pixels increases, and further, power consumption and noise increase. In other words, high-speed readout within a range wherein increased power consumption and noise can be suppressed does not exhibit sufficient alleviation of deformation and distortion of subject images.

Also, the techniques described in Japanese Unexamined Patent Application Publication Nos. 2004-140149, 2004-159555, and 2005-65074 involve increasing the pixel size, so there are restrictions that this cannot be applied to small image sensors with a great number of pixels.

Also, the technique described in Japanese Unexamined Patent Application Publication No. 2006-58945 requires a reference image for correcting taken images, and accordingly cannot be used for general-purpose applications.

Thus, there is a need for a simple configuration capable of correcting distortion due to focal plane shutter effects in a taken image.

An image processing device according to an embodiment of the present invention comprises: image acquisition means, for acquiring a plurality of image data sets configured of a plurality of pixels disposed in array fashion and having subject distortion due to focal plane shutter effects and corresponding to taken images taken at continuous exposure timings; coefficient storage means for storing particular coefficients, the coefficients being determined by which number-in-order of a plurality of images that the image data set, acquired by the image acquisition means, corresponds to, and determined by each pixel position in the image; multiplying means for multiplying a pixel value of a predetermined pixel in the image data sets, acquired by the image acquisition means, by the particular coefficient stored in the coefficient storage means; and adding means for adding each pixel value of a predetermined number of the image data sets, including the image data sets having the pixels which have been multiplied by the particular coefficients by the multiplying means; wherein the particular coefficients stored in the coefficient storage means include a coefficient wherein, at the image data set taken at the earliest point-in-time of the image data sets subjected to addition by the adding means, pixels exposed at an early point-in-time are weighted less and pixels exposed at a late point-in-time are weighted more, and a coefficient wherein, at the image data set taken at the latest point-in-time of the image data sets subjected to addition by the adding means, pixels exposed at an early point-in-time are weighted more and pixels exposed at a late point-in-time are weighted less.

The image processing device may further comprise image-taking means for taking an image of a predetermined subject, and the image acquisition means may acquire the image data sets obtained by being taken by the image-taking means. The image-taking means may have photoelectric conversion functions.

The particular coefficients stored in the coefficient storage means may include particular coefficients multiplied on predetermined pixels of the image data sets other than the image data set taken at the earliest point-in-time and the image data set taken at the latest point-in-time of the image data sets subjected to addition by the adding means, with the multiplying means multiplying the particular coefficients stored in the coefficient storage means on pixel values of predetermined pixels of three or more of the image data sets, of the image data sets subjected to addition by the adding means.

The adding means may further comprise: holding means for temporarily holding an image data frame; and pixel value adding means for adding the pixel values of corresponding pixels of one or the other of the image data set having the pixels on which the particular coefficient has been multiplied by the multiplying means and the image data set acquired by the image acquisition means, and the image data frame held in the holding means; with one or the other of the image data set taken at the earliest point-in-time of the image data sets subjected to addition by the adding means and the image data set calculated by addition of pixel values of corresponding pixels by the pixel adding means being overwritten on the holding means so as to be held therein.

The image processing device may further comprise: a plurality of image data holding means for holding the image data sets acquired by the image acquisition means; and selecting means for selecting which of the plurality of image data holding means to supply the image data sets acquired by the image acquisition means to so as to be held therein; with the number of the multiplying means provided being the same as that of the image data holding means, in a corresponding manner; the multiplying means reading out the particular coefficient from the particular coefficients stored in the coefficient storage means as necessary, based on the number-in-order of image-taking of the image data set held in the corresponding image data holding means within the plurality of image data sets added by the adding means, and executing multiplication of the pixel values of predetermined pixels of the image data set by the particular coefficient.

The selecting means may select, of the image data sets hold in the plurality of image data holding means, the image data holding means where the image data set taken at the earliest point-in-time is being held, as the data holding means to hold the image data set newly acquired by the image acquisition means.

The image data set acquired by the image acquisition means may be RAW format data. The image data set acquired by the image acquisition means may be image data wherein RAW format data has been subjected to predetermined processing so as to be displayable in a viewable state.

The image processing device may further comprise signal processing means for adjusting pixel signals of each of the pixels included in the image data set acquired by the image acquisition means, to a desired signal form or signal level.

In the event that the image data set acquired by the image acquisition means is analog signals, the signal processing means may execute processing for converting analog signals into digital signals. In the event that the image data set acquired by the image acquisition means is RAW format data, the signal processing means may execute processing for setting a black level of a signal processing system, and interpolating the signal level of dropped pixels which do not perform normal signal output, based on surrounding normal pixel signal levels.

In the event that the image data set acquired by the image acquisition means is image data wherein RAW format data has been subjected to predetermined processing so as to be displayable in a viewable state, the signal processing means may execute processing for subjecting the image data to inverse gamma conversion, so as to have the same brightness signal properties as RAW format data.

The image processing device may further comprise operating input acquisition means for receiving operating input of a user, with the operating input acquisition means receiving operating input for setting the predetermined number of the image data sets to be added by the adding means.

The image processing device may further comprise operating input acquisition means for receiving operating input of a user, with the operating input acquisition means receiving operating input for setting the particular coefficients stored by the coefficient storage means.

According to another embodiment of the present invention, an image processing method for an image processing device which uses a plurality of image data frames to generate a corrected image of a taken image having subject distortion due to focal plane shutter effects comprises the steps of: acquiring a plurality of image data sets configured of a plurality of pixels disposed in array fashion and having subject distortion due to focal plane shutter effects and corresponding to a plurality of taken images taken at continuous exposure timings; acquiring, from a coefficient storage unit for storing particular coefficients, coefficients determined by which number-in-order of a plurality of images that the acquired image data set corresponds to, and determined by each pixel position in the image; multiplying of a pixel value of a predetermined pixel in the image data sets by the particular coefficient which has been acquired; and adding of each pixel value of a predetermined number of the image data sets, including the image data sets having the pixels which have been multiplied by the particular coefficients; wherein the particular coefficients stored in the coefficient storage unit include a coefficient wherein, at the image data set taken at the earliest point-in-time of the plurality of image data sets subjected to addition, pixels exposed at an early point-in-time are weighted less and pixels exposed at a late point-in-time are weighted more, and a coefficient wherein, at the image data set taken at the latest point-in-time of the plurality of image data sets subjected to addition, pixels exposed at an early point-in-time are weighted more and pixels exposed at a late point-in-time are weighted less.

According to another embodiment of the present invention, with a program for causing a computer to execute processing of using a plurality of image data frames to generate a corrected image of a taken image having subject distortion due to focal plane shutter effects, the processing comprises the steps of: controlling acquisition of a plurality of image data sets configured of a plurality of pixels disposed in array fashion and having subject distortion due to focal plane shutter effects and corresponding to a plurality of taken images taken at continuous exposure timings; controlling acquisition, from a coefficient storage unit for storing particular coefficients, of coefficients determined by which number-in-order of a plurality of images that the acquired image data set corresponds to, and determined by each pixel position in the image; controlling multiplying of a pixel value of a predetermined pixel in the image data sets by the particular coefficient regarding which acquisition has been controlled; and controlling adding of each pixel value of a predetermined number of the image data sets, including the image data sets having the pixels which have been multiplied by the particular coefficients; wherein the particular coefficients stored in the coefficient storage unit include a coefficient wherein, at the image data set taken at the earliest point-in-time of the plurality of image data sets subjected to addition, pixels exposed at an early point-in-time are weighted less and pixels exposed at a late point-in-time are weighted more, and a coefficient wherein, at the image data set taken at the latest point-in-time of the plurality of image data sets subjected to addition, pixels exposed at an early point-in-time are weighted more and pixels exposed at a late point-in-time are weighted less. The program may be stored in a recording medium.

According to an embodiment of the present invention, a plurality of image data sets configured of a plurality of pixels disposed in array fashion and having subject distortion due to focal plane shutter effects and corresponding to a plurality of taken images taken at continuous exposure timings are acquired; coefficients, determined by which number-in-order of a plurality of images that the acquired image data set corresponds to, and determined by each pixel position in the image, are acquired; a pixel value of a predetermined pixel in the image data sets is multiplied by the particular coefficient that has been acquired; and each pixel value of a predetermined number of the image data sets, including the image data sets having the pixels which have been multiplied by the particular coefficients, is added. The particular coefficients include a coefficient wherein, at the image data set taken at the earliest point-in-time of the image data sets subjected to addition, pixels exposed at an early point-in-time are weighted less and pixels exposed at a late point-in-time are weighted more, and a coefficient wherein, at the image data set taken at the latest point-in-time of the image data sets subjected to addition, pixels exposed at an early point-in-time are weighted more and pixels exposed at a late point-in-time are weighted less.

The image processing device may be an independent device, or may be a block of a photography device which performs image processing, or may be a block of an information processing device which performs image processing.

The term "network refers to an arrangement wherein at least two or more devices are connected such that information can be transferred from one device to another device. Devices which perform communication over a network may each be an independent device, or may each be internal blocks of a single device.

Also, the term "communication" refers to not only wireless communication and cable communication, but also communication wherein wireless communication and cable communication coexist, i.e., communication wherein wireless communication is performed for a section and cable communication is performed for another section. Further, this includes arrangements wherein communication from one device to another device is performed by wire, and communication from the other device to the one device is performed by wireless communication.

According to the above-described configuration, images can be corrected, and particularly, a corrected image can be generated of a taken image having subject distortion due to focal plane shutter effects, using a plurality of image data sets having subject distortion due to focal plane shutter effects and corresponding to a plurality of taken images taken at continuous exposure timings.

BRIEF DESCRIPTION OF THE DRAWINGS

FIGS. 7A and 7B are diagrams for describing focal plane shutter effects.

DESCRIPTION OF THE PREFERRED EMBODIMENTS

Before describing an embodiment of the present invention, the correspondence between the features of the claims and the specific elements disclosed in an embodiment of the present invention is discussed below. This description is intended to assure that an embodiment supporting the claimed invention is described in this specification. Thus, even if an element in the following embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to the other features of the claims.

Figure 9:
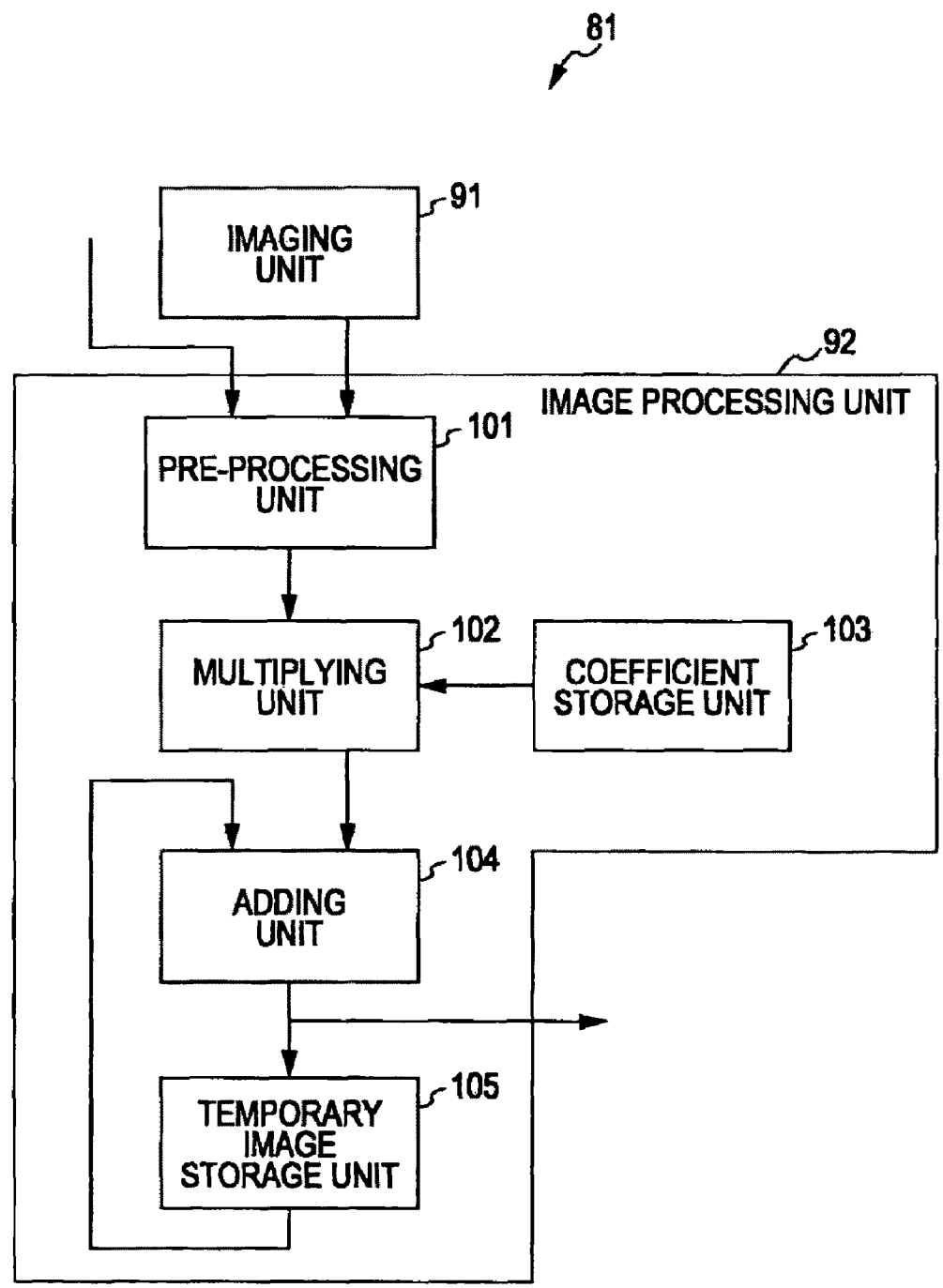
FIG. 9 is a block diagram illustrating the configuration of an image processing device for executing processing for correcting a still image.
Figure 23:
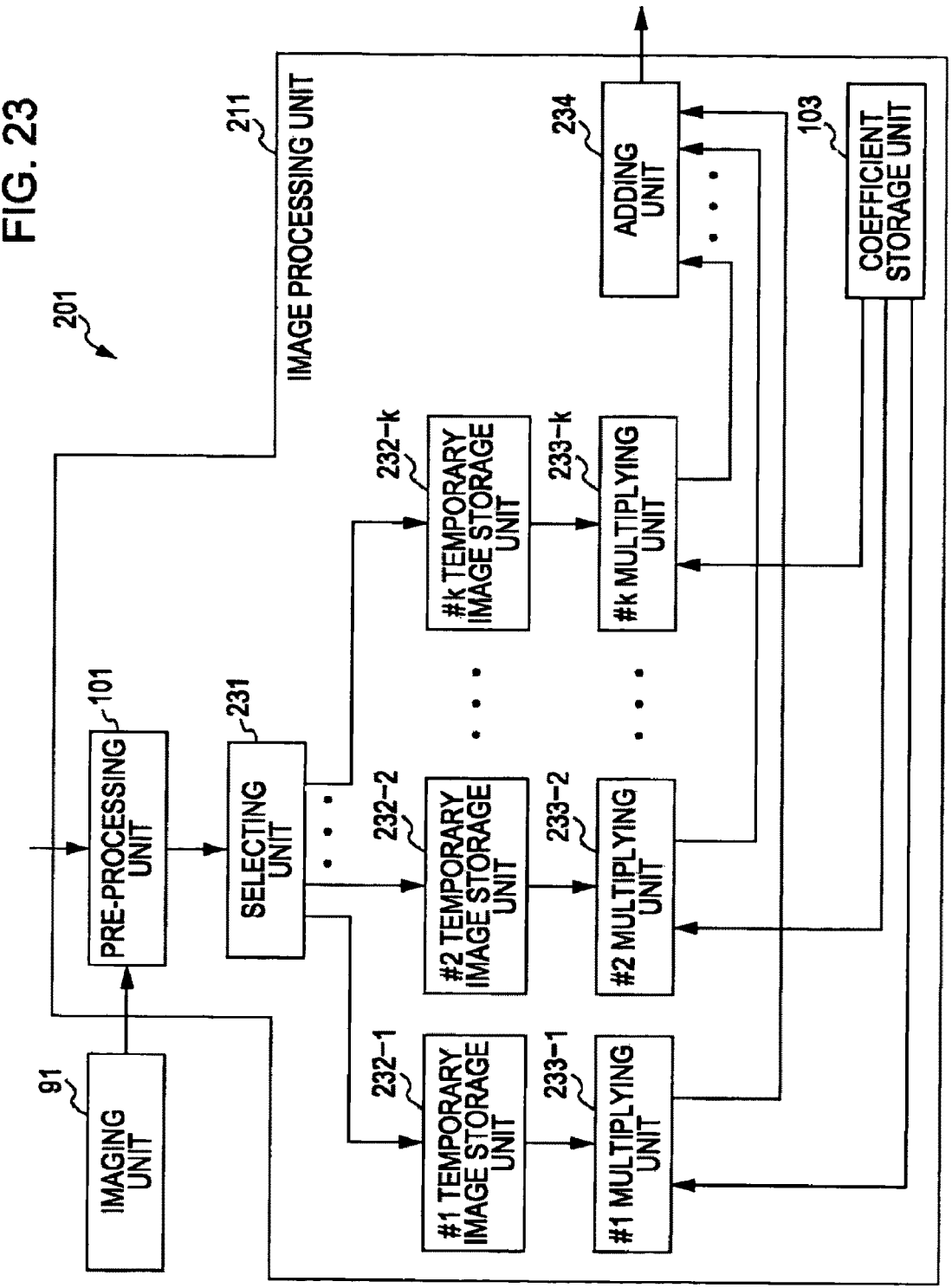
FIG. 23 is a block diagram illustrating the configuration of an image processing device for executing processing for correcting a moving image.

An image processing device according to an embodiment of the present invention includes: an image acquisition unit (e.g., a pre-processing unit 101 in FIG. 9 or FIG. 23), for acquiring a plurality of image data sets configured of a plurality of pixels disposed in array fashion and having subject distortion due to focal plane shutter effects and corresponding to taken images taken at continuous exposure timings; a coefficient storage unit (e.g., a coefficient storage unit 103 in FIG. 9 or FIG. 23) for storing particular coefficients, the coefficients being determined by which number-in-order of a plurality of images that the image data set, acquired by the image acquisition unit, corresponds to, and determined by each pixel position in the image; a multiplying unit (e.g., a multiplying unit 102 in FIG. 9 or a multiplying unit 233 in FIG. 23) for multiplying a pixel value of a predetermined pixel in the image data sets, acquired by the image acquisition unit, by the particular coefficient stored in the coefficient storage unit; and an adding unit (e.g., an adding unit 104 and temporary image storage unit 105 in FIG. 9 or an adding unit 234 in FIG. 23) for adding each pixel value of a predetermined number of the image data sets, including the image data sets having the pixels which have been multiplied by the particular coefficients by the multiplying unit; wherein the particular coefficients stored in the coefficient storage unit include a coefficient wherein, at the image data set taken at the earliest point-in-time of the image data sets subjected to addition by the adding unit, pixels exposed at an early point-in-time (e.g., pixels of the first row) are weighted less (e.g., coefficient a=0) and pixels exposed at a late point-in-time (e.g., pixels of the last row) are weighted more (e.g., coefficient a=1), and a coefficient wherein, at the image data set taken at the latest point-in-time of the image data sets subjected to addition by the adding unit, pixels exposed at an early point-in-time are weighted more and pixels exposed at a late point-in-time are weighted less.

The image processing device may further an image-taking unit (e.g., an image-taking unit 91 in FIG. 9 or in FIG. 23) for taking an image of a predetermined subject, with the image acquisition unit being capable of acquiring the image data sets obtained by being taken by the image-taking unit. The image-taking unit may have photoelectric conversion functions (e.g., a CMOS image sensor).

The adding unit may further include: a holding unit (e.g., the temporary image storage unit 105 in FIG. 9) for temporarily holding an image data frame; and a pixel value adding unit (e.g., the adding unit 104 in FIG. 9) for adding the pixel values of corresponding pixels of one or the other of the image data set having the pixels on which the particular coefficient has been multiplied by the multiplying unit and the image data set acquired by the image acquisition unit, and the image data frame held in the holding unit; wherein one or the other of the image data set taken at the earliest point-in-time of the image data sets subjected to addition by the adding unit and the image data set calculated by addition of pixel values of corresponding pixels by the pixel adding unit is overwritten on the holding unit so as to be held therein.

The image processing device may further include: a plurality of image data holding units (e.g., temporary image storage units 232 in FIG. 23) for holding the image data sets acquired by the image acquisition unit; and a selecting unit (e.g., selecting unit 231 in FIG. 23) for selecting which of the plurality of image data holding units to supply the image data sets acquired by the image acquisition unit to so as to be held therein. The number of the multiplying units provided may be the same as that of the image data holding units, in a corresponding manner, and the multiplying unit may read out the particular coefficient from the particular coefficients stored in the coefficient storage unit as necessary, based on the number-in-order of image-taking of the image data set held in the corresponding image data holding unit within the plurality of image data sets added by the adding unit, and execute multiplication of the pixel values of predetermined pixels of the image data set by the particular coefficient.

The image processing device may further include a signal processing unit (e.g., the pre-processing unit 101 in FIG. 9 or in FIG. 23) for adjusting pixel signals of each of the pixels included in the image data set acquired by the image acquisition unit, to a desired signal form or signal level.

The image processing device may further include an operating input acquisition unit (e.g., a user interface 143 in FIG. 20 or in FIG. 24) for receiving operating input of a user, with the operating input acquisition unit receiving operating input for setting the predetermined number of the image data sets to be added by the adding unit.

The image processing device may further include an operating input acquisition unit (e.g., the user interface 143 in FIG. 20 or in FIG. 24) for receiving operating input of a user with the operating input acquisition unit receiving operating input for setting the particular coefficients stored by the coefficient storage unit.

According to an embodiment of the present invention, an image processing method for an image processing device which uses a plurality of image data frames to generate a corrected image of a taken image having subject distortion due to focal plane shutter effects includes the steps of: acquiring a plurality of image data sets configured of a plurality of pixels disposed in array fashion and having subject distortion due to focal plane shutter effects and corresponding to a plurality of taken images taken at continuous exposure timings (e.g., the processing of steps S41 or S50 in FIG. 22 or step S121 in FIG. 28); acquiring, from a coefficient storage unit (e.g., the coefficient storage unit 103 in FIG. 9 or 23) for storing particular coefficients, coefficients determined by which number-in-order of a plurality of images that the acquired image data set corresponds to, and determined by each pixel position in the image (e.g., the processing of step S43 in FIG. 22 or step S124 in FIG. 28); multiplying of a pixel value of a predetermined pixel in the image data sets by the particular coefficient that has been acquired (e.g., the processing of step S44 in FIG. 22 or step S125 in FIG. 28); and adding of each pixel value of a predetermined number of the image data sets, including the image data sets having the pixels which have been multiplied by the particular coefficients (e.g., the processing of step S47 in FIG. 22 or step S127 in FIG. 28); wherein the particular coefficients stored in the coefficient storage unit include a coefficient wherein, at the image data set taken at the earliest point-in-time of the plurality of image data sets subjected to addition, pixels exposed at an early point-in-time (e.g., pixels of the first row) are weighted less (e.g., coefficient a=0) and pixels exposed at a late point-in-time (e.g., pixels of the last row) are weighted more (e.g., coefficient a=1), and a coefficient wherein, at the image data set taken at the latest point-in-time of the plurality of image data sets subjected to addition, pixels exposed at an early point-in-time are weighted more and pixels exposed at a late point-in-time are weighted less.

According to an embodiment of the present invention, with a program for causing a computer to execute processing of using a plurality of image data frames to generate a corrected image of a taken image having subject distortion due to focal plane shutter effects, the processing includes the steps of: acquiring a plurality of image data sets configured of a plurality of pixels disposed in array fashion and having subject distortion due to focal plane shutter effects and corresponding to a plurality of taken images taken at continuous exposure timings (e.g., the processing of steps S41 or S50 in FIG. 22 or step S121 in FIG. 28); acquiring, from a coefficient storage unit (e.g., the coefficient storage unit 103 in FIG. 9 or 23) for storing particular coefficients, coefficients determined by which number-in-order of a plurality of images that the acquired image data set corresponds to, and determined by each pixel position in the image (e.g., the processing of step S43 in FIG. 22 or step S124 in FIG. 28); multiplying of a pixel value of a predetermined pixel in the image data sets by the particular coefficient regarding which acquisition has been controlled (e.g., the processing of step S44 in FIG. 22 or step S125 in FIG. 28); and adding of each pixel value of a predetermined number of the image data sets, including the image data sets having the pixels which have been multiplied by the particular coefficients (e.g., the processing of step S47 in FIG. 22 or step S127 in FIG. 28); wherein the particular coefficients stored in the coefficient storage unit include a coefficient wherein, at the image data set taken at the earliest point-in-time of the image data sets subjected to addition, pixels exposed at an early point-in-time (e.g., pixels of the first row) are weighted less (e.g., coefficient a=0) and pixels exposed at a late point-in-time (e.g., pixels of the last row) are weighted more (e.g., coefficient a=1), and a coefficient wherein, at the image data set taken at the latest point-in-time of the image data sets subjected to addition, pixels exposed at an early point-in-time are weighted more and pixels exposed at a late point-in-time are weighted less.

Now, an embodiment of the present invention will be described with reference to the drawings.

Images taken with a camera having a built-in CMOS image sensor exhibit image distortion of moving subjects or subjects taken while the camera is moving, due to focal plane shutter effects owing to general focal plane shutter operations, inherent to the structure of the CMOS image sensor.

To deal with this, a CMOS image sensor capable of high-speed image-taking is used to take multiple continuous images, pixels in each of the taken images are multiplied by coefficients corresponding to the pixel positions as necessary, and the these pixel data are added (synthesized), thereby generating a corrected image whereby image distortion occurring due to focal plane shutter effects is alleviated, and providing good images and video which are more agreeable to view.

Multiple continuous images that have been taken with a CMOS image sensor capable of high-speed readout, e.g., four times that of normal photography, are used, with image processing being performed at an image processing device configured of image memory, a processor, etc., thereby reducing distortion in the shape of the subject in taken images, occurring due to focal plane shutter effects. This technique will be described below.

FIG. 9 is a block diagram illustrating the configuration of an image processing device 81 which performs such image processing. The image processing device 81 is arranged so as to be able to obtain a still image wherein image distortion due to focal plane shutter effects have been corrected, based on multiple frames of taken images.

The image processing device 81 is configured of an image-taking unit 91 and image processing unit 92. The image-taking unit 91 is configured of optical elements such as lenses and the like, and an image-taking device having a configuration wherein the above-described focal plane shutter effects occur. The image-taking device may be a solid-state image-taking device wherein photoreceptor elements corresponding to pixels having photoelectric conversion functions are disposed in array fashion. An example is an XY address-type imaging device.

An XY address-type imaging device is a sensor employing a readout format wherein the address (position) of each pixel is specified, so as to read out each pixel data. That is to say, unlike a image-taking device format wherein data is sequentially transferred from each pixel as with a CCD, this arrangement involves charges stored in photodiodes or the like being read out.

Figure 1:
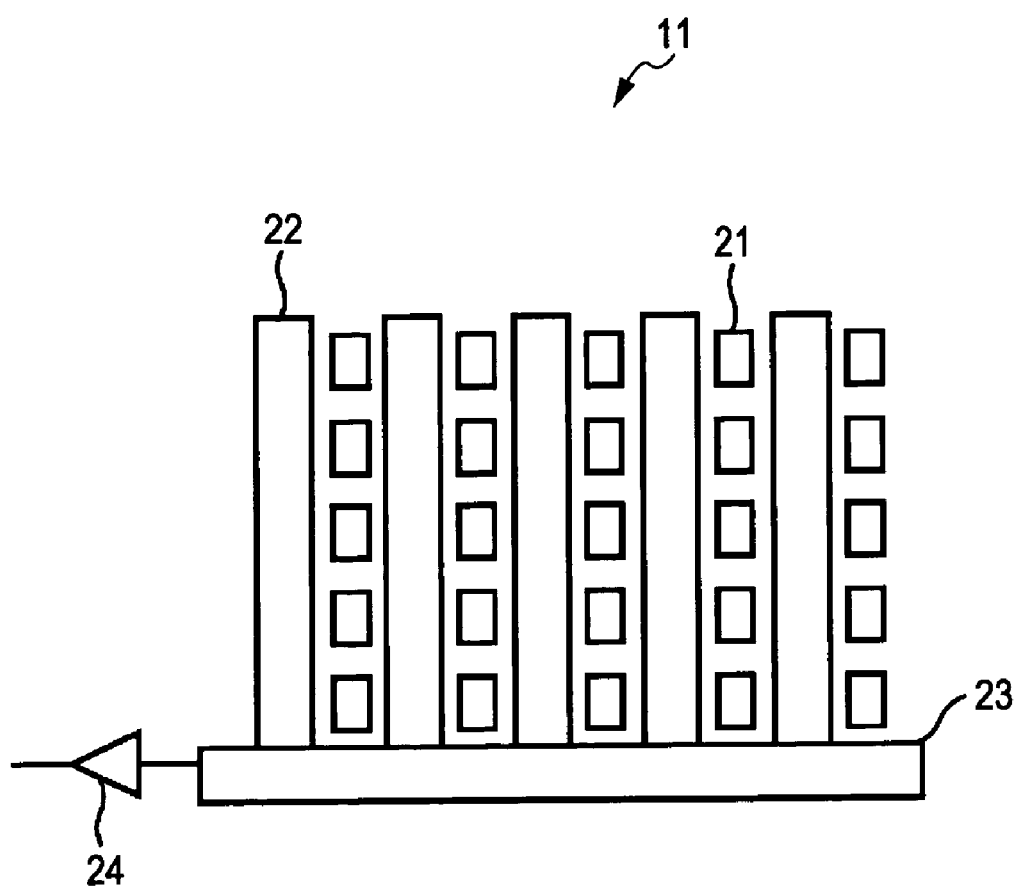
FIG. 1 is a diagram for describing a CCD.
Figure 2A:
FIGS. 2A through 2C are diagrams for describing exposure operations of a CCD.
Figure 2B:
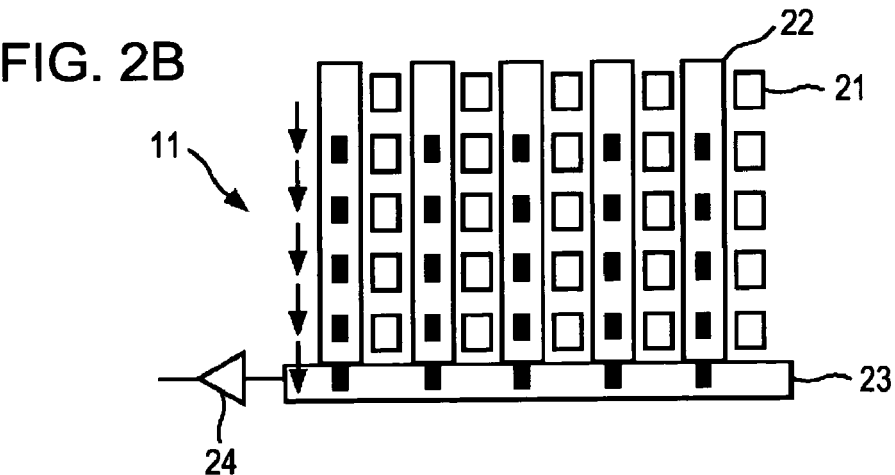
Figure 2C:
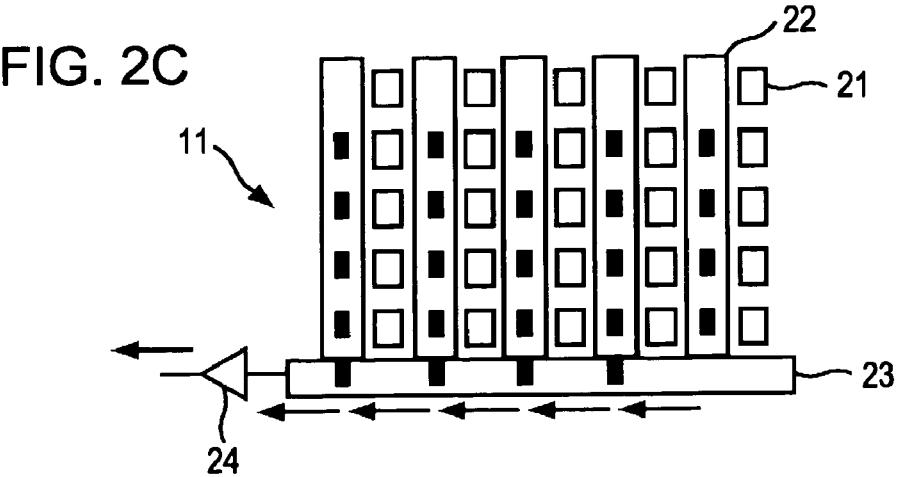
Figure 3:
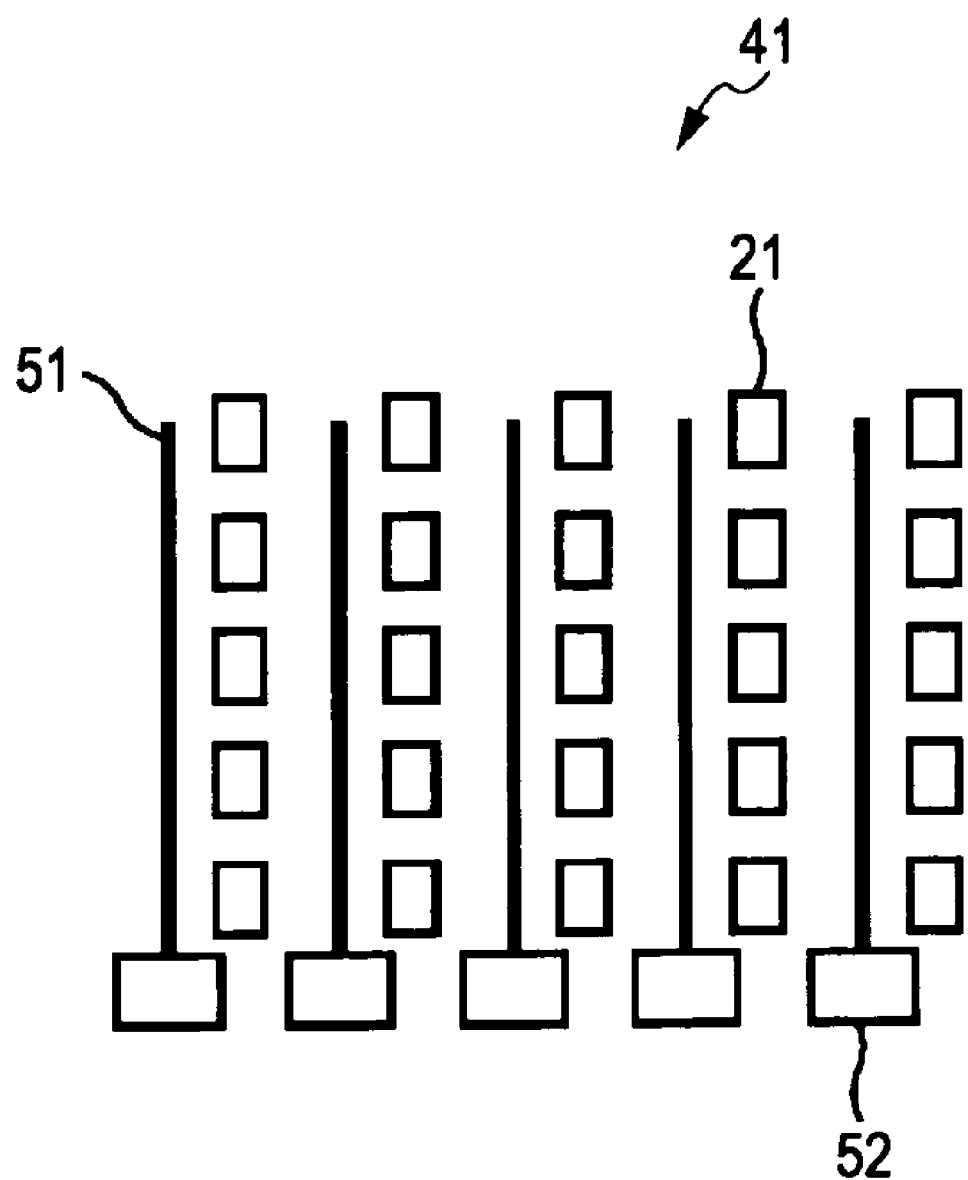
FIG. 3 is a diagram for describing a CMOS image sensor.
Figure 4A:
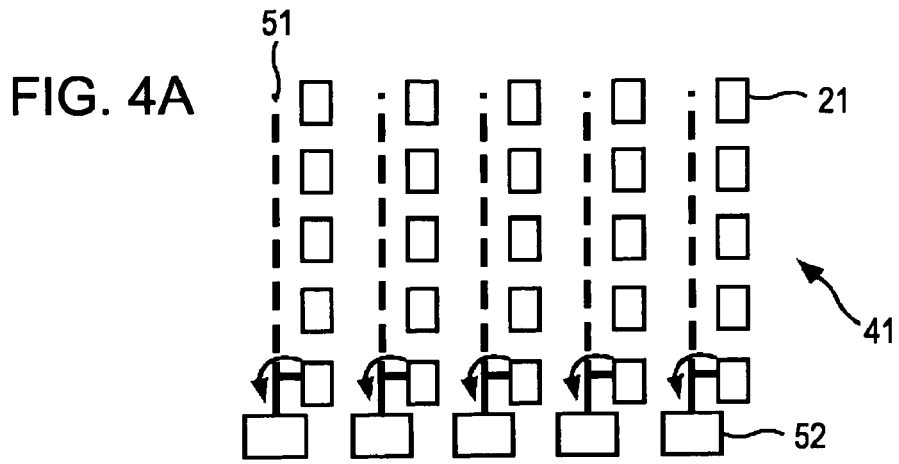
FIGS. 4A through 4C are diagrams for describing exposure operations of a CMOS image sensor.
Figure 4B:
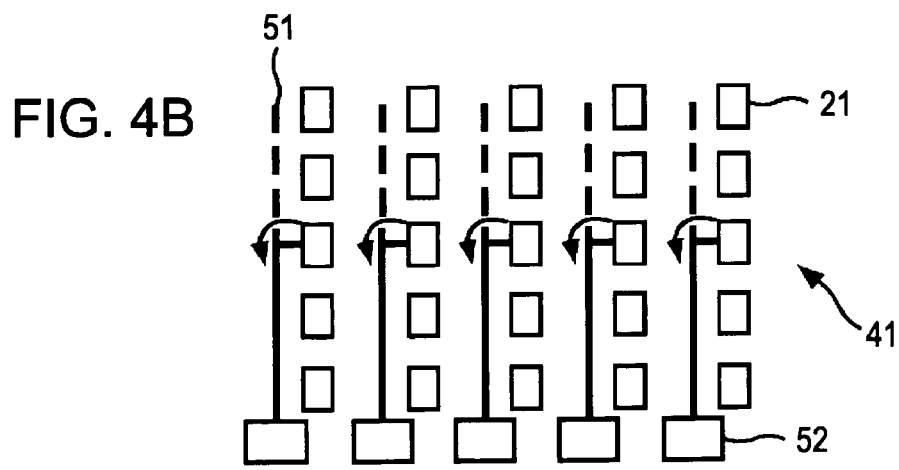
Figure 4C:
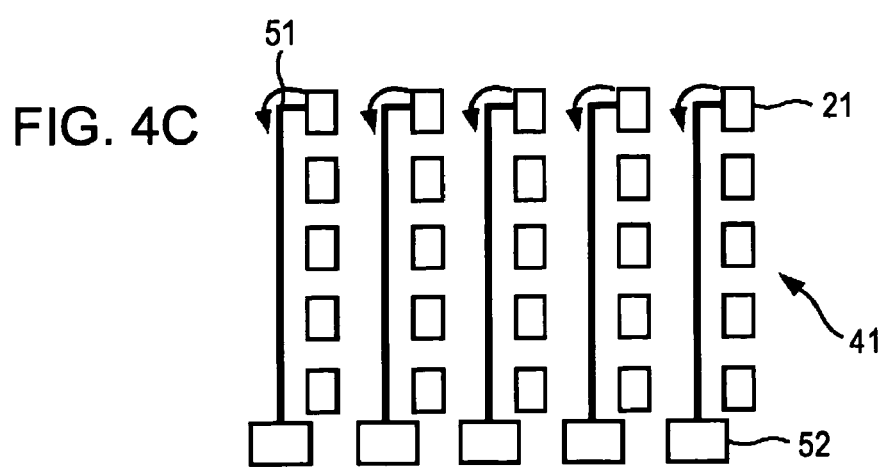
Figure 5:
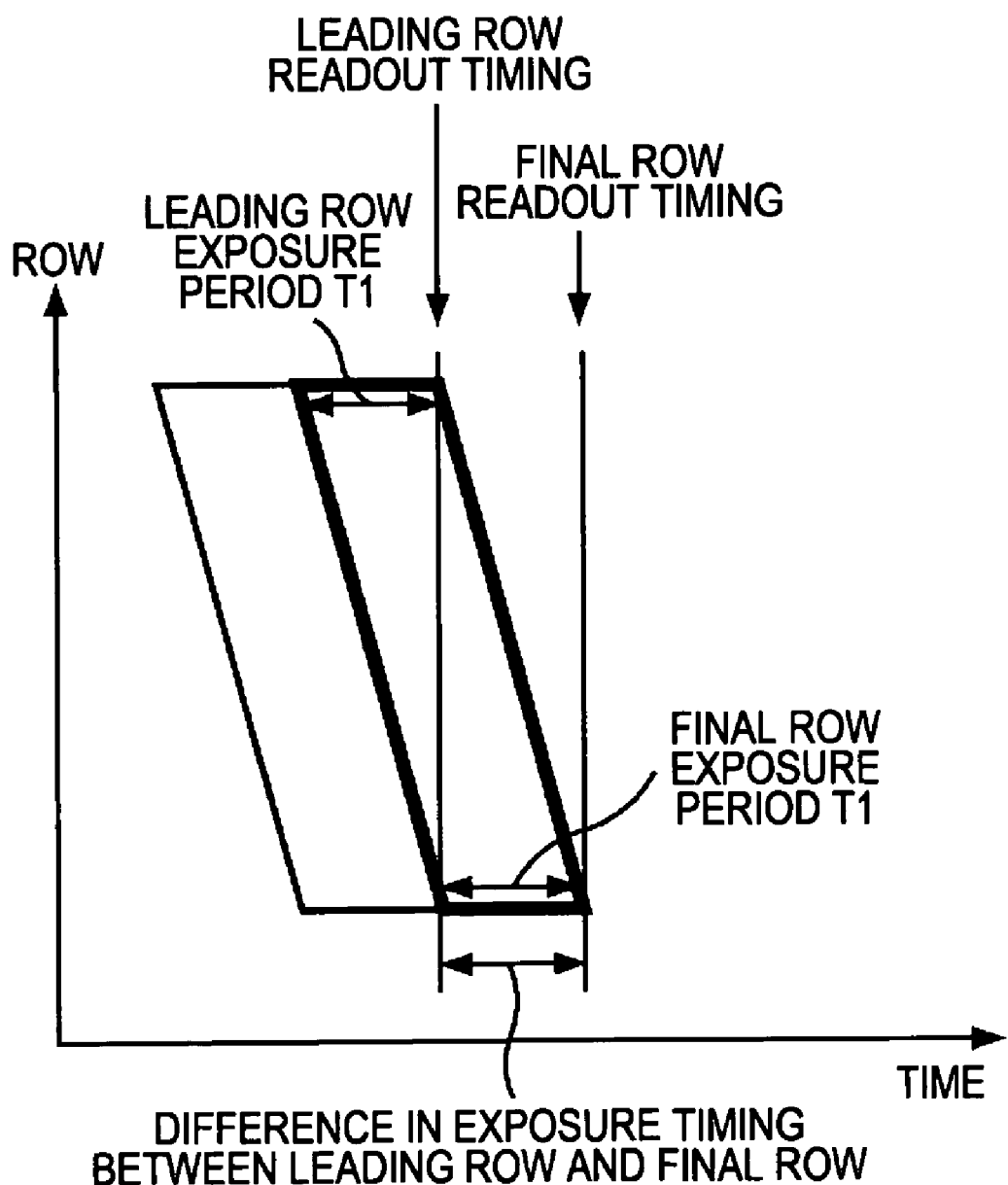
FIG. 5 is a diagram for describing focal plane shutter effects.
Figure 6:
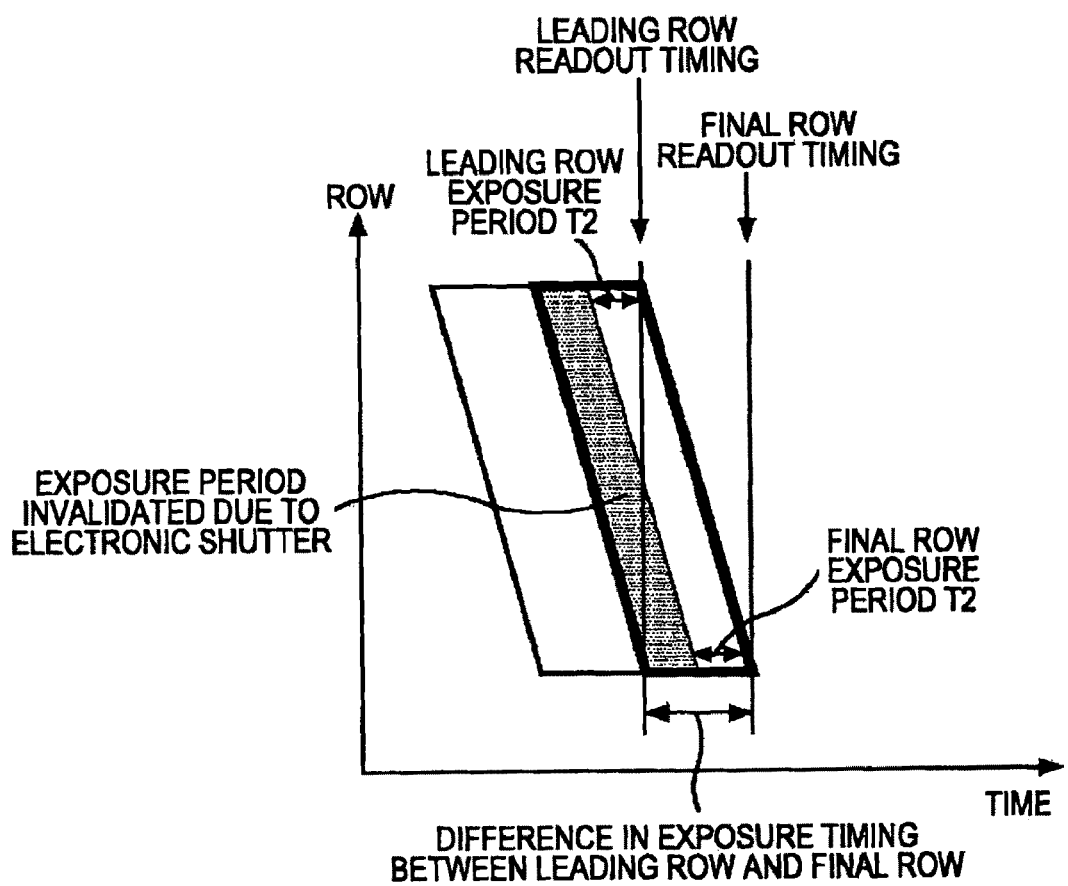
FIG. 6 is a diagram for describing focal plane shutter effects.

XY address-type imaging devices are not restricted to the CMOS image sensor described with reference to FIGS. 3 and 4. Other examples include LBCAST (Lateral Buried Charge Accumulator and Sensing Transistor array) and Stacked-AMI (Stacked Amplified MOS intelligent Imager), which have cell amplifiers for readout provided to each pixel, as with a CMOS image sensor. While amplifiers used with CMOS image sensors are MOSFETs (Metal Oxide Semiconductor Field Effect Transistors), LBCASTs use JFETs (Junction Field Effect Transistors).

Figure 8B:
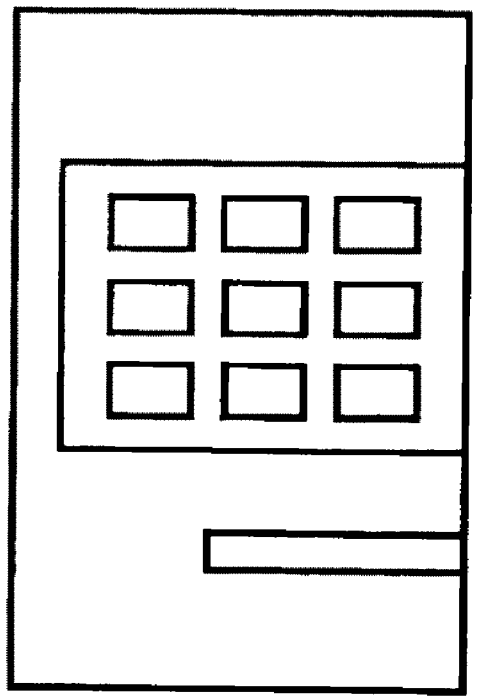
FIGS. 8A and 8B are diagrams for describing focal plane shutter effects.
Figure 8A:
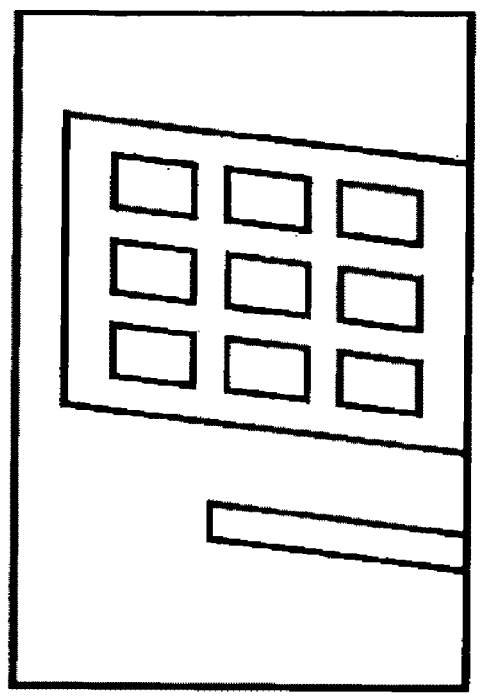

The image-taking unit 91 is capable of taking continuous images at a frame rate faster than the shutter speed of normal digital still cameras (e.g., 1/60 seconds), around four times as fast for example (e.g., 1/240 seconds). Image signals taken by the image-taking unit 91 have different exposure timings for each row, as described above. Note that even at a frame rate of four times the shutter speed of normal digital still cameras, distortion occurs in taken images due to focal plane shutter effects, in cases of taking subjects moving at high speeds as described with FIG. 7, or cases of moving the camera quickly (panning) as described with FIG. 8, for example.

Image signals taken by the image-taking unit 91 are supplied to the image processing unit 92. It is needless to say that the image processing unit 92 can acquire and process image data recorded in another device.

In the event of acquiring and processing image data recorded in another device, the acquired image data is a group of images in a series, taken continuously. The group of images in a series may either be so called RAW format data which has been taken by an image-taking device like the image-taking device used in the image-taking unit 91 and with the image signals thereof remaining unprocessed, i.e., simply digitized electric signals obtained form the image-taking device, or may be image data which is obtained by the RAW format data having been subjected to processing so as to be viewable as an image.

The image processing unit 92 is configured of a pre-processing unit 101, multiplying unit 102, coefficient storage unit 103, adding unit 104, and temporary image storage unit 105.

The pre-processing unit 101 is for executing processing for putting each pixel signal into a desired signal form and signal level. For example, in the event that the pixel signals input from the image-taking unit 91 or another unshown device are analog signals, the input pixel signals are converted from analog signals into digital signals, and supplied top the multiplying unit 102. Also, in the event that the pixel signals input from the image-taking unit 91 or another unshown device are RAW format data wherein the electric signals obtained for the image-taking device have only been digitized, the pre-processing unit 101 sets a black level for the signal processing system based on the pixel signal level of a shielded portion of the image-taking device or the like, executes interpolation processing wherein the signal levels of dropout pixels not performing correct signal output are interpolated using surrounding normal pixel signal levels, and supplies the image data configured of the post-interpolation pixel signals to the multiplying unit 102. Also, in the event that the pixel signals input from another unshown device for example are data in a displayable state, the pre-processing unit 101 subjects the input pixel signals to processing for converting into signals having the same brightness signal curve (brightness signal properties) as RAW format data by inverse gamma conversion, and then sets a black level for the signal processing system based on the pixel signal level of a shielded portion of the image-taking device or the like, executes interpolation processing wherein the signal levels of any dropout pixels not performing correct signal output are interpolated using surrounding normal pixel signal levels, and supplies the image data configured of the post-interpolation pixel signals to the multiplying unit 102.

The multiplying unit 102 multiplies, of the pixel signals supplied from the pre-processing unit 101, predetermined pixel signals, by predetermined coefficients stored in the coefficient storage unit 103, and supplies to the adding unit 104. The multiplying unit 102 supplies pixel signals to subjected to multiplication processing to the adding unit 104 without change. The coefficient storage unit 103 stores coefficients used at the multiplying unit 102. Details of the multiplication processing performed at the multiplying unit 102 and the coefficients thereof will be described later.

In the event that data has not been stored in the temporary image storage unit 105 yet, the adding unit 104 supplies one frame of pixel signals supplied form the multiplying unit 102 to the temporary image storage unit 105. On the other hand, in the event that there are image signals stored in the temporary image storage unit 105, the one frame of pixel signals supplied form the multiplying unit 102 and the image signals stored in the temporary image storage unit 105 are synthesized, and the image signals generated by this synthesizing are either supplied to the temporary image storage unit 105, or externally output. That is to say, the adding unit 104 adds multiple image data frames (at least a part thereof being image data frames subjected to multiplication processing by the multiplying unit 102), and externally outputs the addition results. Details of the addition processing by the adding unit 104 will be described later. The temporary image storage unit 105 temporarily stores the one frame of image signals supplied from the adding unit 104.

Next, multiplication processing by the multiplying unit 102 and addition processing by the adding unit 104 will be described with reference to FIG. 10.

The image processing device 81 uses k frames (wherein k is an integer of 2 or greater) of taken images wherein focal plane shutter effects have occurred, i.e., wherein the exposure time differs for each row in the taken images, and can perform compensation so as to yield an image close to a taken image obtained by global shutter operations, i.e., a taken image wherein the exposure time of each pixel included in one frame is the same.

Figure 10:
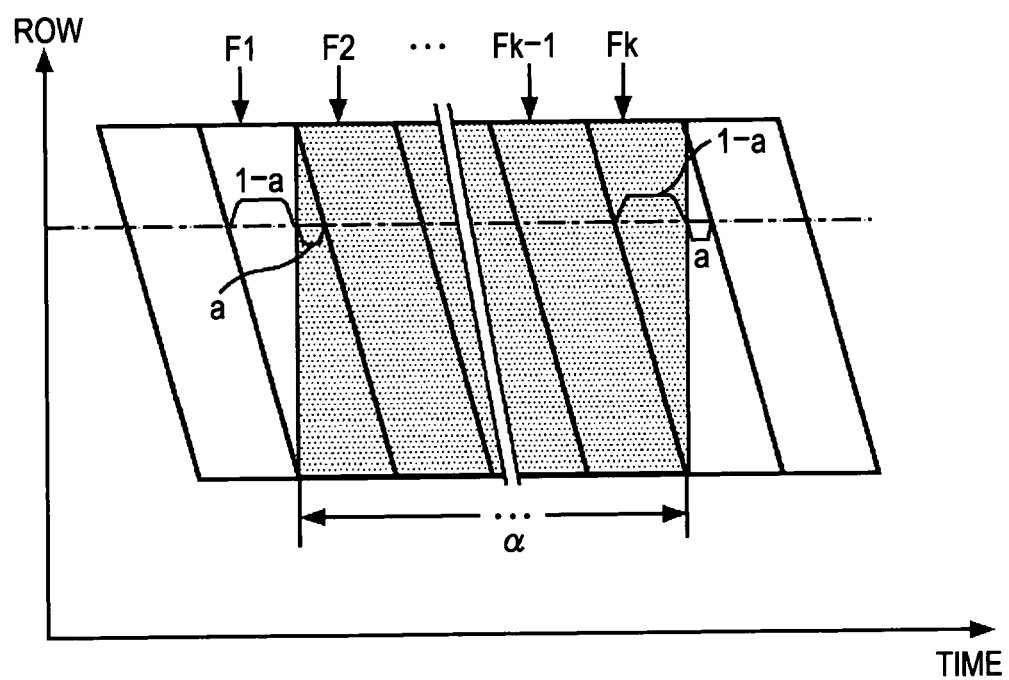
FIG. 10 is a diagram for describing correction using multiple image data frames.

That is to say, at the image processing device 81, corrected images assuming a case of exposure with global shutter operations are generated (the section α in FIG. 10, shown as the hatched region) corresponding to the series of continuously-shot images, i.e., F1, F2, and so on through F(k−1) and Fk. In each of these continuously-shot images, the exposure timing is off by one pixel between the top portion and bottom portion of the image, due to the focal plane shutter effects.

Specifically, as described above, with each of the taken image data frames, the exposure timing is off by one pixel between the top portion and bottom portion of the image, so in the first image data frame F1, coefficients are obtained such that the higher in the image, the less contribution there is to computation, and conversely, the lower in the image, the greater contribution there is to computation. Also, with the final image data frame Fk, coefficients are obtained such that the higher in the image, the more contribution there is to computation, and conversely, the lower in the image, the less contribution there is to computation.

Now, if we say that there are M rows of pixels in the entire image (i.e., that the vertical number of pixels is M pixels), the coefficient "a" multiplied on each pixel value of each row in the first image data frame F1 may be such that, for example, coefficient a=0 for the pixels of the first row, coefficient a=1/M for the pixels of the next row, coefficient a=2/M for the pixels of the next row, and so on, with the coefficient being incremented by 1/M, such that at the final row, the coefficient is (M−1)/M=1. The coefficient a corresponding to the respective rows is multiplied on the pixel value of each pixel of each row in the first image data frame F1. That is to say, due to multiplication processing being performed on the first image data frame F1, an image data frame can be obtained which is lighter toward the leading row and closer to normal concentration closer to the last row.

The pixels in the image data frames from the second image data frame F2 to the second-from-last image data frame F(k−1) are not subjected to multiplication by the coefficients. The pixel values of each row in the final image data frame Fk are multiplied by the coefficient (1−a). That is to say, multiplication processing is performed on the last image data frame Fk such that image frame data can be obtained which is closer to normal concentration toward the leading row and lighter closer to the last row.

Thus, following coefficients being multiplied in accordance with the number-in-order of each of the taken image data frames and the pixel positions therein, the pixel values of the pixels of the K image data frames are each added.

The obtained synthesized image data frames aF1+F2+ . . . F(k−1)+(1−a)Fk serve as corrected images assuming a case of exposure with global shutter operations, as shown in the section α in FIG. 10.

Now, the greater the number of images that are synthesized, the more corrected the distortion of the subjected in the image data generated by synthesizing appears. However, the greater the number of images that are synthesized, there is so-called blurring in images of moving subjects (or subjects which appear to move in the screen due to the camera moving). This blurring can be suppressed well by raising the frame rate as much as possible when taking the images to be synthesized. For example, the blurring occurring in a corrected image obtained in a case of using three image data frames taken at a frame rate three times the shutter speed of a normal digital camera and performing synthesizing processing is approximately equivalent to the blurring occurring in a normal digital still camera.

Also, whether a better taken image can be obtained by improving the precision of blurring of the subject or by suppressing blurring depends on shooting conditions, such as the type of subject to be taken, how fast it is moving, how fast the camera is panned, and so forth. Accordingly, it is desirable to have an arrangement wherein the number of image data frames to be synthesized can be set by the user.

Now, with regard to the coefficient "a", saying that there are M rows of pixels in the entire image (i.e., that the vertical number of pixels is M pixels), description has been made regarding an arrangement wherein the coefficient "a" applied to the pixels of the first row is coefficient a=0, coefficient a=1/M for the pixels of the next row, coefficient a=2/M for the pixels of the next row, and so on, with the coefficient being incremented by 1/M, such that at the final row, the coefficient is (M−1)/M=1; however, the present embodiment is by no means restricted to this arrangement, and it is clearly understood that other coefficient appropriation methods can be applied as long as the first row is assigned a small value, i.e., a value close to 0, and the final row is assigned a great value, i.e., value close to 1. The coefficient can be suitably set depending on the speed of motion of the subject, the speed of motion of the camera, the shutter speed, and the frame rate.

Figure 11:
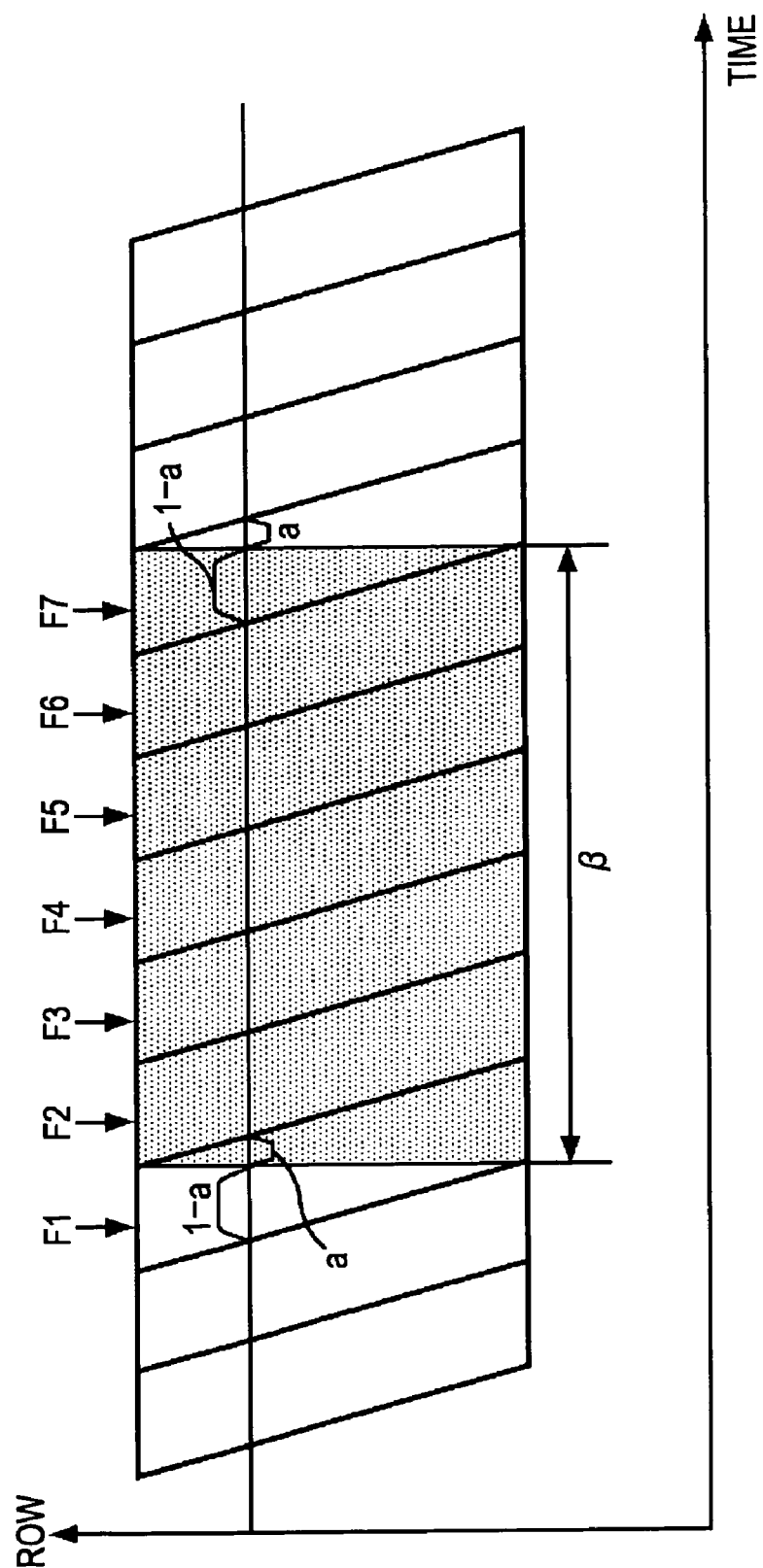
FIG. 11 is a diagram for describing correction using seven image data frames.

FIG. 11 illustrates a specific example wherein k=7. The coefficient a corresponding to the respective rows is multiplied on each pixel of each row in the first image data frame F1. That is to say, due to multiplication processing being performed on the first image data frame F1, an image data frame can be obtained which is lighter toward the leading row and closer to normal concentration closer to the last row.

The pixels in the image data frames from the second image data frame F2 to the second-from-last image data frame F6 are not subjected to multiplication by the coefficients. The pixel values of each row in the final image data frame F7 are multiplied by the coefficient (1−a). That is to, say, multiplication processing is performed on the last image data frame F7 such that image frame data can be obtained which is closer to normal concentration toward the leading row and lighter closer to the last row.

Thus, coefficients are multiplied depending on the number-in-order of the taken image data frame, and the pixel position therein, following which the pixel values of each of the pixels of the seven image data frames are added.

The obtained synthesized image data frames aF1+F2+ . . . F6+(1−a)F7 serve as corrected images assuming a case of exposure with global shutter operations, as shown in the section β in FIG. 11.

Figure 12:
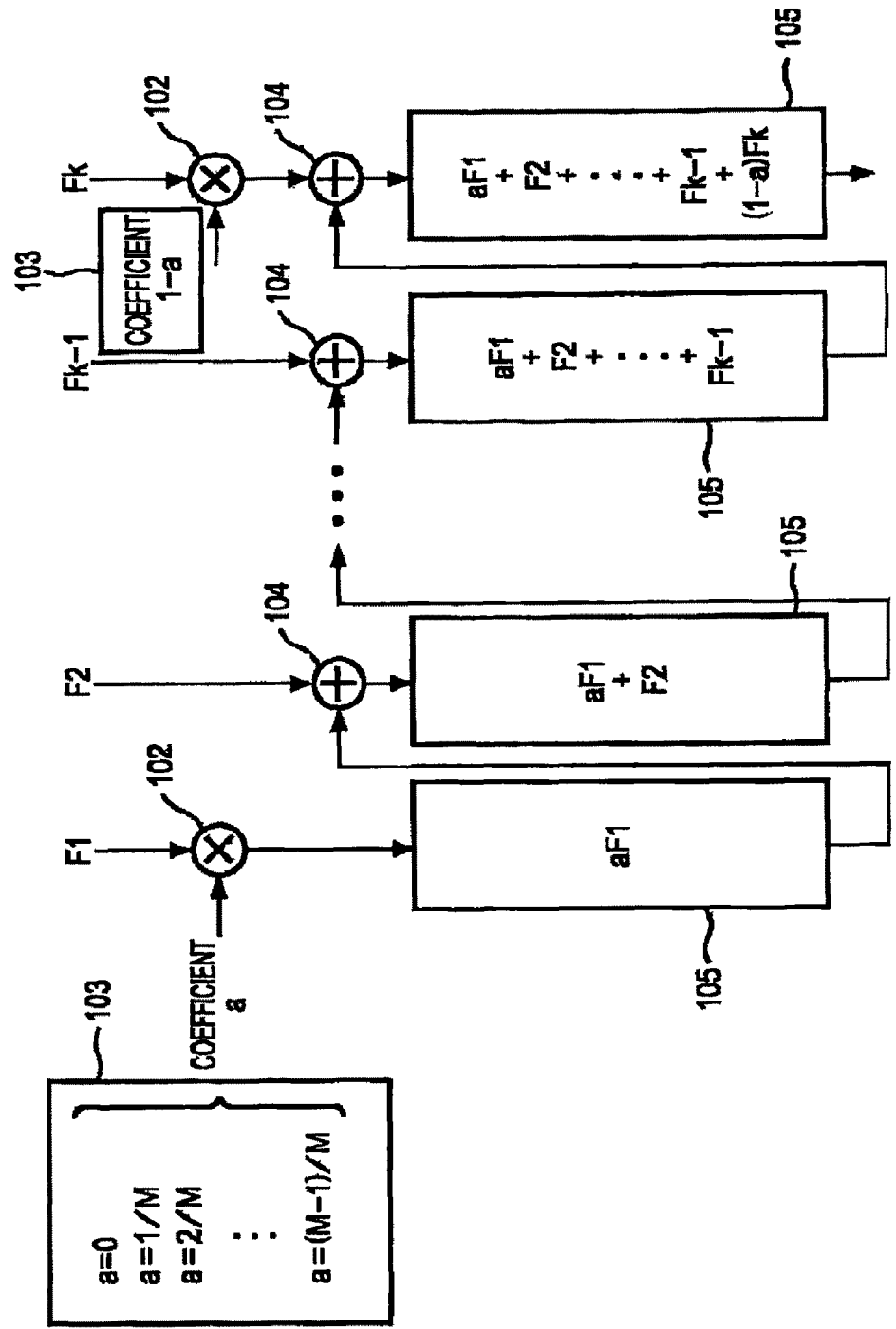
FIG. 12 is a diagram for describing coefficient multiplication processing and addition processing with regard to an image data frame.

Next, the flow of computation and signal processing in a case wherein a corrected image is generated using k sets of frame image data, with reference to FIG. 12.

The coefficient storage unit 103 stores the coefficient a to be multiplied on each row of the first frame to be synthesized, and the coefficient (1−a) to be multiplied on each row of the last frame to be synthesized.

Now, as described with reference to FIG. 10, saying that there are M rows of pixels in the entire image (i.e., that the vertical number of pixels is M pixels), an arrangement may be made wherein, for example, the coefficient a applied to the pixels of the first row is coefficient a=0, coefficient a=1/M for the pixels of the next row, coefficient a=2/M for the pixels of the next row, and so on, with the coefficient being incremented by 1/M, such that at the final row, the coefficient is (M−1)/M=1, or another coefficient appropriation method can be applied wherein the first row is assigned a small value, i.e., a value close to 0, and the final row is assigned a great value, i.e., a value close to 1.

Upon the first image data frame F1 being input to the multiplying unit 102, the multiplying unit 102 reads out the coefficient a set for each row that is stored in the coefficient storage unit 103, and multiplies this on the pixel values of the pixels of each row of the image data frame F1. The obtained image data frame aF1 is supplied to the temporary image storage unit 105 via the multiplying unit 104 (though no multiplication processing is performed by the multiplying unit 104), and stored.

Upon the second image data frame F2 being input to the multiplying unit 102, the multiplying unit 102 performs no multiplication processing, but addition processing (addition processing of each of the pixel values) is performed at the adding unit 104 of the image data frame F2 with the image data frame aF1 stored in the temporary image storage unit 105, thereby generating an image data frame aF1+F2, which is the addition results. The generated image data frame aF1+F2 is supplied to the temporary image storage unit 105 and stored.

The same processing as with the second image data frame F2 is performed for the third image data frame F3 through the second-from-last image data frame F(k−1), so that the image data frame aF1+F2 . . . F(k−1) is supplied to the temporary image storage unit 105 and stored.

Upon the last, i.e., k'th image data frame Fk being input to the multiplying unit 102, the multiplying unit 102 reads out the coefficient (1−a) set for each row that is stored in the coefficient storage unit 103, and multiplies the pixel values of the pixels of each row of the image data frame Fk. The obtained image data frame (1−a)Fk is supplied to the multiplying unit 104, where addition processing (addition processing of each of the pixel values) is performed with the image data frame aF1+F2 . . . F(k−1) stored in the temporary image storage unit 105, thereby generating an image data frame aF1+F2 . . . F(k−1)+(1−a)Fk, which serves as the corrected image.

Thus, a corrected image assuming a taken image taken with global shutter operations of an exposure time as shown as the section α in FIG. 10, indicated by hatching, i.e., a synthesized image corrected such that the exposure timing is closer between the top and bottom of the image, can be obtained.

Figure 13:
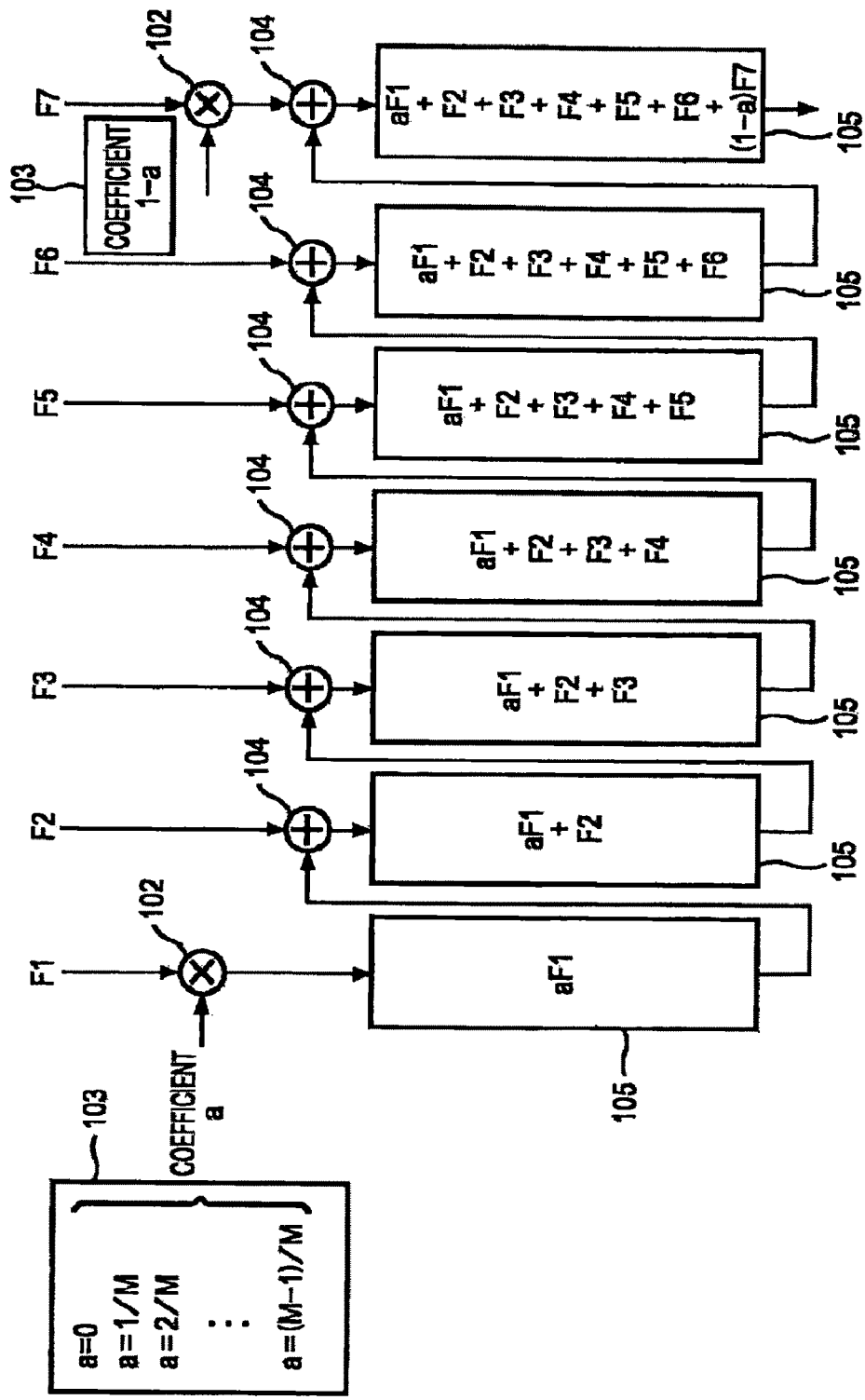
FIG. 13 is a diagram for describing coefficient multiplication processing and addition processing with regard to an image data frame.

FIG. 13 illustrates a specific example of the flow of computation and signal processing in a case wherein a corrected image is generated using 7 sets of frame image data (k=7).

Upon the first image data frame F1 being input to the multiplying unit 102, the multiplying unit 102 reads out the coefficient a set for each row that is stored in the coefficient storage unit 103, and multiplies each row of the image data frame F1. The obtained image data frame aF1 is supplied to the temporary image storage unit 105 via the multiplying unit 104 and stored.

Upon the second image data frame F2 through sixth image data frame F6 being input to the multiplying unit 102, the multiplying unit 102 performs no multiplication processing, but addition processing (addition processing of each of the pixel values) is performed at the adding unit 104 with the image data frame stored in the temporary image storage unit 105, thereby generating an image data frame aF1+F2+F3+F4+F5+F6 at the end of addition of the sixth image data frame F6. The generated image data frame aF1+F2+F3+F4+F5+F6 is supplied to the temporary image storage unit 105 and stored.

Upon the seventh and last image data frame F7 being input to the multiplying unit 102, the multiplying unit 102 reads out the coefficient (1−a) set for each row that is stored in the coefficient storage unit 103, and multiplies each row of the image data frame F7. The obtained image data frame (1−a)F7 is supplied to the multiplying unit 104, where addition processing (addition processing of each of the pixel values) is performed with the image data frame aF1+F2+F3+F4+F5+F6 stored in the temporary image storage unit 105, thereby generating an image data frame aF1+F2+F3+F4+F5+F6+(1−a)F7, which serves as the corrected image.

Figure 14:
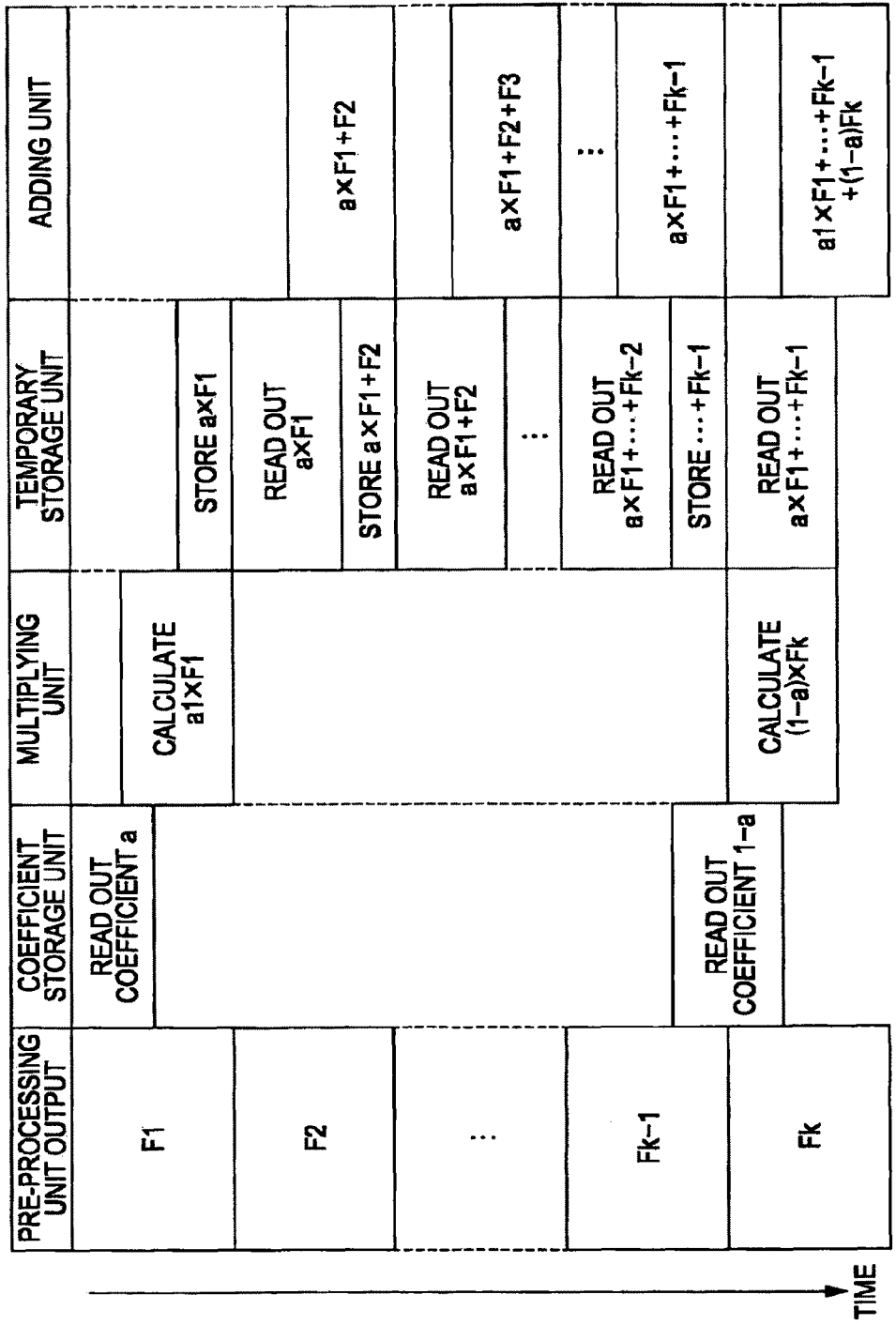
FIG. 14 is a diagram for describing coefficient multiplication processing and addition processing with regard to an image data frame.

Next, the processing that is executed by each of the units described with reference to FIG. 12 will be described in time-sequence with reference to FIG. 14.

While the first image data frame F1 is being output from the pre-processing unit 101, the coefficient a that is stored in the coefficient storage unit 103 is read out, the coefficient a is multiplied on each row of the image data frame F1 at the multiplying unit 102, and the obtained image data frame aF1 is supplied to the temporary image storage unit 105 via the adding unit 104 (though no adding processing is performed by the adding unit 104), and stored.

While the second image data frame F2 is being output from the pre-processing unit 101, no coefficient is read out from the coefficient storage unit 103 and the multiplying unit 102 performs no multiplication processing, but the image data frame aF1 stored in the temporary image storage unit 105 is read out to the adding unit 104 and addition processing (addition processing of each of the pixel values of the pixels) is performed at the adding unit 104 between the image data frame aF1 and the image data frame F2, with the generated image data frame aF1+F2 being supplied to the temporary image storage unit 105 and stored.

In the same way as the second image data frame F2 being output from the pre-processing unit 101, while the third image data frame F3 through K−1'th image data frame F(k−1) are being output from the pre-processing unit 101, no coefficient is read out from the coefficient storage unit 103 and the multiplying unit 102 performs no multiplication processing, but the image data frame stored in the temporary image storage unit 105 is read out to the adding unit 104 and addition processing (addition processing of each of the pixel values) is performed at the adding unit 104 between the image data frame read out from the temporary image storage unit 105 and the image data frame that is newly supplied, with the generated image data frame being supplied to the temporary image storage unit 105 and stored.

Upon the k'th image data frame Fk being output from the pre-processing unit 101, out the coefficient (1−a) is read out from the coefficient storage unit 103, the multiplying unit 102 multiplies each corresponding pixel of the image data frame Fk with the coefficient (1−a), and an image data frame (1−a)Fk is obtained. The image data frame aF1+F2 . . . F(k−1) stored in the temporary image storage unit 105 is read out to the adding unit 104, where addition processing (addition processing of each of the pixel values) is performed between the image data frame aF1+F2 . . . F(k−1) and the image data frame (1−a)Fk, so the obtained image data frame aF1+F2 . . . F(k−1)+(1−a)Fk is output from the adding unit 104 as corrected image data.

Note that while the example described above is an example wherein only the temporally first image data frame F1 and last image data frame Fk of the images to be synthesized are multiplied by the coefficients, it is needless to say that the present embodiment is not restricted to this arrangement, and that arrangements may be made wherein three or more optional image data frames, or all image data frames for that matter, are multiplied by optionally set coefficients, as necessary, so as to carry out correction processing different from that described above.

In such an arrangement wherein three or more optional image data frames, or all image data frames, are multiplied by optionally set coefficients, a desirable setting is to have the coefficients to be multiplied on each of the image data frames to be smaller at the leading row and greater at the last row closer to the first image data frame, and to be greater at the leading row and smaller at the last row closer to the last image data frame.

Specifically, in the event that optional coefficients are to be set for all image data frames for example, an arrangement may be made in a case wherein synthesizing processing is to be performed using (2X+1) sets of image data with each image data frame having M rows of pixels (i.e., the vertical number of pixels is M pixels), such that coefficient (1/M)(k/X) is assigned to pixels of the first row for the k image data frames from the first image data frame to the X'th image data frame, coefficient (2/M)(k/X) to the next row of pixels therein, coefficient (3/M)(k/X) to the next row of pixels therein, and so on, so that the coefficient is incremented by (1/M)(k/M) toward the final row, with a coefficient (M−1)/M (k/X) for the last row, and such that no coefficient is multiplied at the X+1'th image (i.e., each row is multiplied by a coefficient 1), and such that coefficient (1/M)(2X+2−k)/X is assigned to pixels of the last row for the k image data frames from the X+2'th image data frame to the 2X+1'th image data frame, coefficient (2/M)(2X+2−k)/X to the row of pixels one before the last row, coefficient (3/M)(2X+2−k)/X to the preceding row of pixels therein, and so on, so that the coefficient is incremented by (1/M)(2X+2−k)/X toward the first row, with a coefficient (M−1)/M(2X+2−k)/X for the last row.

Also, these coefficients may be made settable by the user, so as to be suitably set depending on the speed of motion of the subject, the speed of motion of the camera, the shutter speed, and the frame rate.

Figure 15:
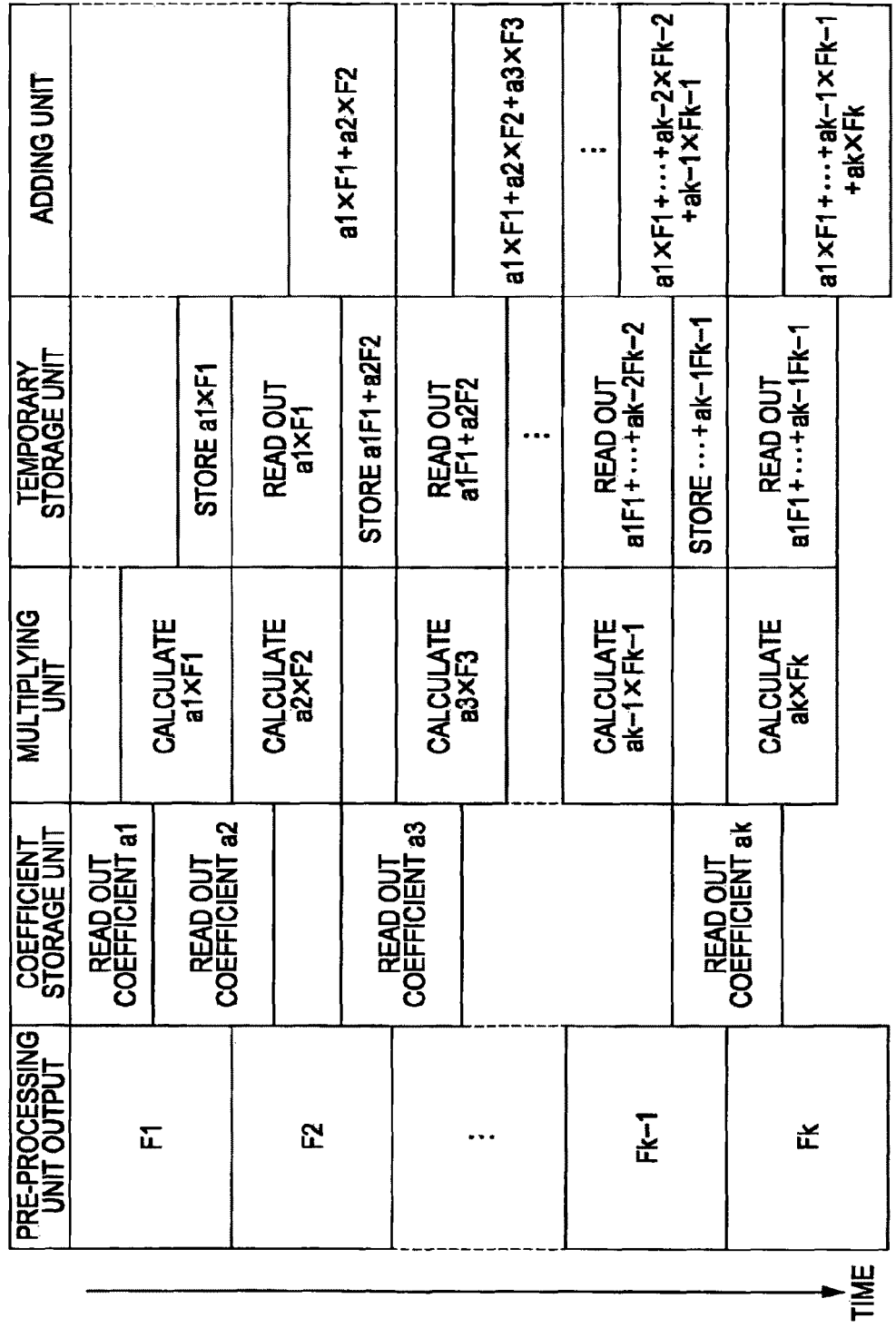
FIG. 15 is a diagram for describing coefficient multiplication processing and addition processing with regard to an image data frame.

The processing that is executed by each of the units described with reference to FIG. 12 in an arrangement wherein the coefficients set for each row to be multiplied on each synthesizing image data frame are a1, a2, a3, and so on through ak, will be described in time-sequence with reference to FIG. 15.

While the first image data frame F1 is being output from the pre-processing unit 101, the coefficient a1 is read out from the coefficient storage unit 103, the coefficient a1 is multiplied on each corresponding pixel of the image data frame F1 at the multiplying unit 102, and the obtained image data frame a1×F1 is supplied to the temporary image storage unit 105 via the multiplying unit 104 (though no multiplication processing is performed by the multiplying unit 104), and stored.

While the second image data frame F2 is being output from the pre-processing unit 101, the coefficient a2 is read out from the coefficient storage unit 103, the coefficient a2 is multiplied on each corresponding pixel of the image data frame F2 at the multiplying unit 102, the obtained image data frame a2×F2 is subjected to addition processing (addition processing of each of the pixel values) at the adding unit 104 with the image data frame a2×F2 stored in the temporary image storage unit 105, with the generated image data frame a1×F1+a2×F2 being supplied to the temporary image storage unit 105 and stored.

In the same way as the second image data frame F2 being output from the pre-processing unit 101, while the third image data frame F3 through k−1'th image data frame F(k−1) are being output from the pre-processing unit 101, the corresponding coefficient (the corresponding coefficient from coefficient a3 through coefficient a(k−1)) is read out from the coefficient storage unit 103, the coefficient which has been read out is multiplied on each corresponding pixel of the image data frame (the corresponding image data from of image data frame F3 through k−1'th image data frame F(k−1)) supplied from the pre-processing unit 101 at the multiplying unit 102, the obtained image data frame is subjected to addition processing (addition processing of each of the pixel values) at the adding unit 104 with the image data frame stored in the temporary image storage unit 105, with the generated image data frame being supplied to the temporary image storage unit 105 and stored.

Upon the k'th image data frame Fk being output from the pre-processing unit 101, the coefficient ak is read out from the coefficient storage unit 103, the multiplying unit 102 multiplies each corresponding pixel of the image data frame Fk with the coefficient ak, and an image data frame ak×Fk is obtained. The image data frame a1×F1+a2×F2 . . . a(k−1)×F (k−1) stored in the temporary image storage unit 105 is read out to the adding unit 104, where addition processing (addition processing of each of the pixel values) is performed between the image data frame a1×F1+a2×F2− . . . a(k−1)×F (k−1) and the image data frame ak×Fk, so the obtained image data frame a1×F1+a2×F2 . . . a(k−1)×F(k−1)+ak×Fk is output from the adding unit 104 as corrected image data.

Figure 16A:
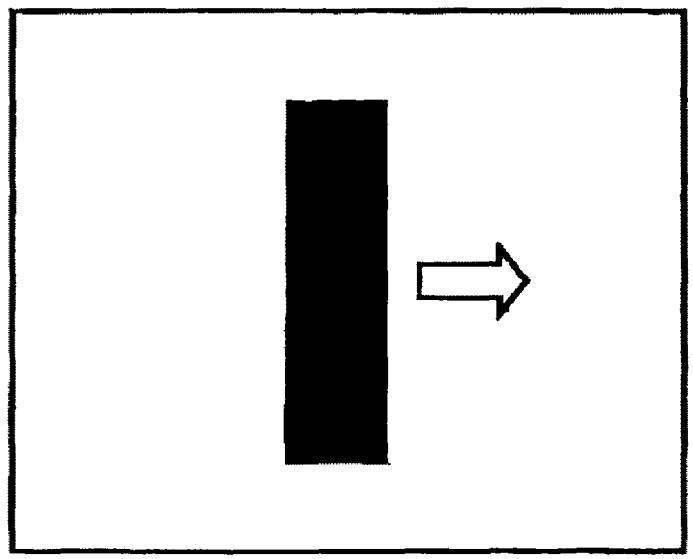
FIGS. 16A and 16B are diagrams for describing focal plane shutter effects.
Figure 16B:
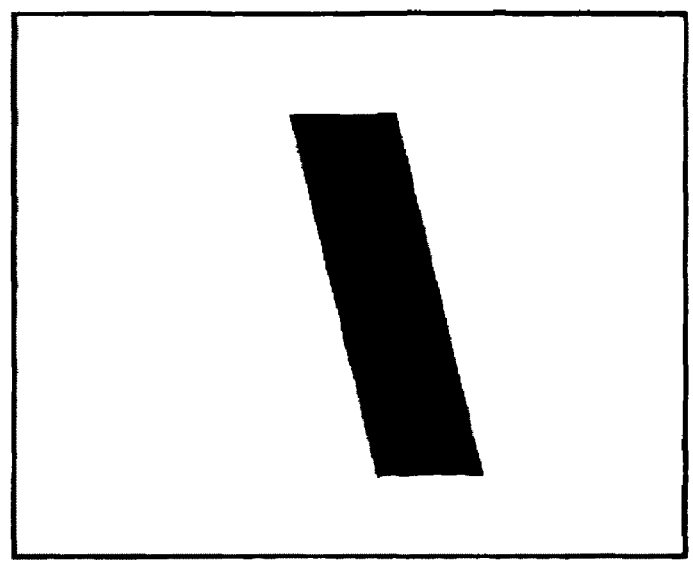

A synthesized image thus obtained will be described with reference to FIGS. 16A through 19. For example, in the event of taking a subject moving toward the right in the image screen as shown in FIG. 16A, with a focal plane shutter operation wherein the lower side of the image is delayed regarding exposure point-in-time as compared to the top of the image, the subject itself is photographed in a distorted manner due to exposure point-in-time offset at each row, as shown in FIG. 16B.

A synthesized image obtained by image synthesizing performed in a case of obtaining three images taken continuously of such a subject and performing the image processing such as described above, i.e., an obtained corrected image, will be described with reference to FIG. 17A through FIG. 18.

Figure 17A:
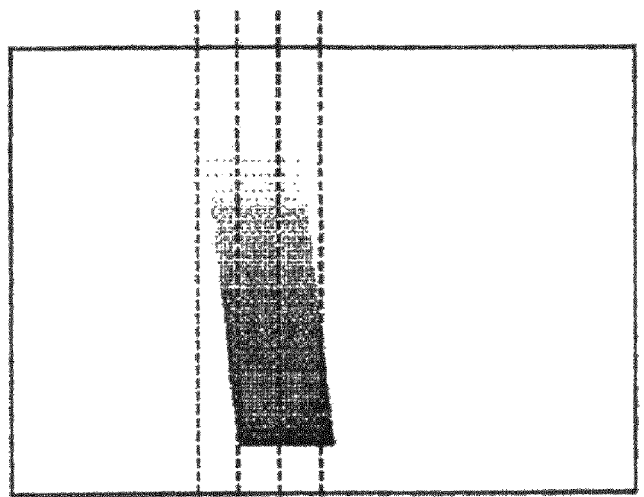
FIGS. 17A through 17C are diagrams for describing an example of an image data frame generated by coefficient multiplication processing.

At the first image, a value close to 0 is set as the coefficient to be multiplied on each pixel of the upper rows in the image of which the exposure point-in-time is earlier, with the value of the coefficient becoming greater lower in the rows, and the coefficient to be multiplied on each pixel of the bottom row is a value close to 1, so as shown in FIG. 17A, the image data frame obtained following coefficient multiplication is light in concentration at the upper side of the image, and is dark in concentration at the lower side of the image.

Figure 17B:
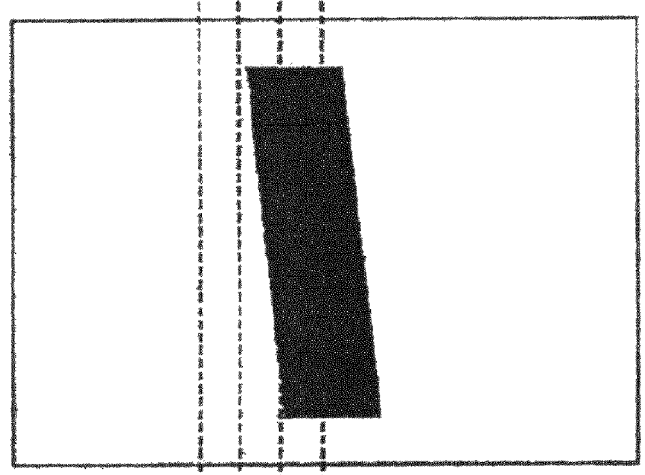

At the second image, no coefficient is multiplied to the pixels, i.e., all pixels are multiplied by a coefficient of 1, so as shown in FIG. 17B, a normal distorted image data frame taken by focal plane operations is obtained.

Figure 17C:
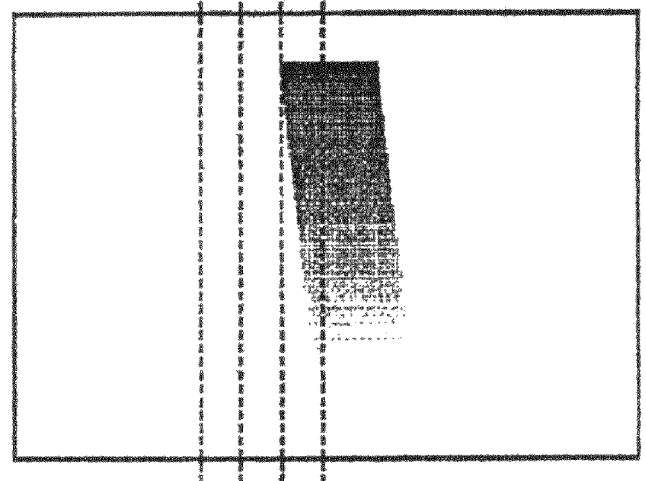

At the third and last image, a value close to 1 is set as the coefficient to be multiplied on each pixel of the upper rows in the image of which the exposure point-in-time is earlier, with the value of the coefficient becoming smaller lower in the rows, and the coefficient to be multiplied on each pixel of the bottom row is a value close to 0, so as shown in FIG. 17C, the image data frame obtained following coefficient calculation is dark in concentration at the upper side of the image, and is light in concentration at the lower side of the image.

Figure 18:
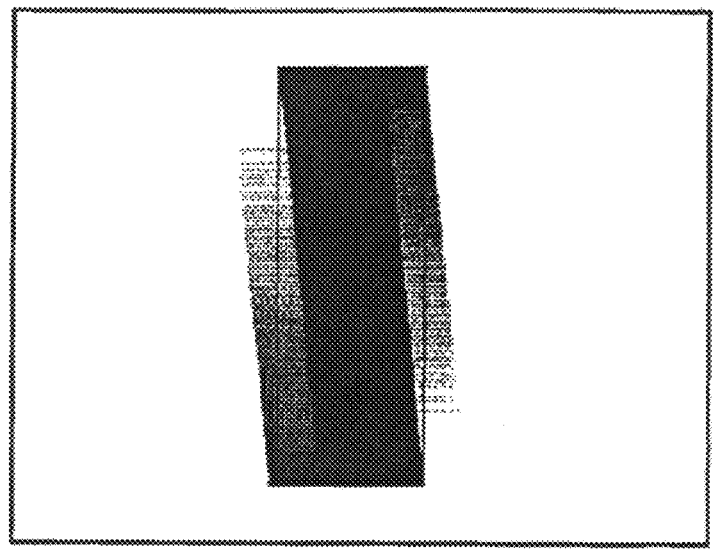
FIG. 18 is a diagram for describing an example of a corrected image that has been synthesized and generated.

Synthesizing these three image data frames obtains a synthesized image such as shown in FIG. 18. The distortion in this image appears to have been corrected, as compared with the image shown in FIG. 16B.

Figure 19:
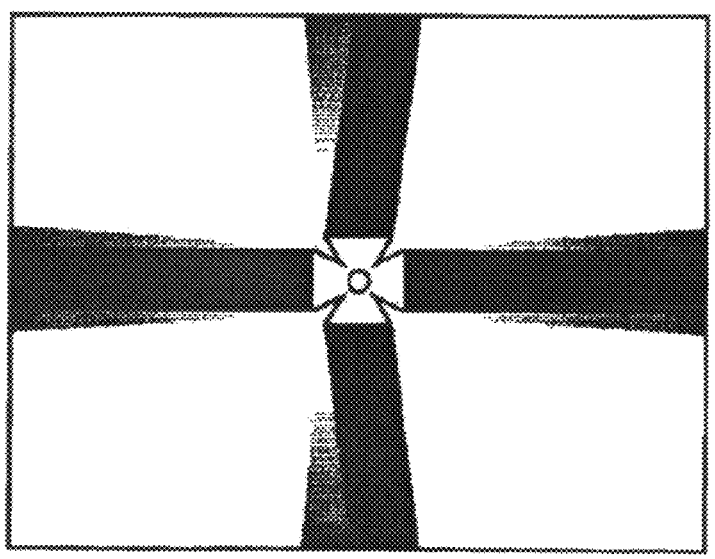
FIG. 19 is a diagram for describing an example of a corrected image that has been synthesized and generated.

Also, performing the above-described synthesizing processing on the image obtained by photographing the rotating blades described with FIG. 7 for example, enables a synthesized image to be obtained wherein the distortion of the blades appears to have been corrected, as shown in FIG. 19, for example.

Now, a configuration example of a still image photography camera (digital still camera) 131 to which the image processing device 81 described above has been applied, is shown in FIG. 20.

The still image photography camera 131 is provided with an image-taking unit 91 and image-processing unit 92 in the same way as with the image processing device 81, and also has a controller 141, memory 142, a user interface 143, a picture signal processing unit 144, an image compressing unit 145, a display unit 146, an external interface 147, a large-capacity storage unit 148, a control signal bus 151, and an image data bus 152.

The controller 141 controls operations of the units of the still image photography camera 131, based on operating input of the user, supplied form the user interface 143. The controller 141 is connected to each of the units via the control signal bus 151. The memory 142 stores information necessary for the processing which the controller 141 is to execute. The user interface 143 receives operating input from the user, which is supplied to the controller 141 via the control signal bus 151, and also includes a display unit for notifying the user of parameters set for the still image photography camera 131, and so forth.

The picture signal processing unit 144 receives corrected image data frames subjected to the above-described synthesizing processing, output from the image processing unit 92, based on control of the controller 141, and performs predetermined processing necessary for display or storage, such as gamma conversion for example. The image compressing unit 145 compresses the image data frame that has been subjected to the predetermined processing at the picture signal processing unit 144, for external output or storage in the large-capacity storage unit 148, based on control of the controller 141. The display unit 146 is supplied with and displays the image data frame, based on control of the controller 141.

The external interface 147 externally outputs data that has been processed at the picture signal processing unit 144, compressed by processing at the image compressing unit 145, or stored in the large-capacity storage unit 148, based on control of the controller 141. Also, the external interface 147 acquires data supplied from external devices, supplies the acquired data to the picture signal processing unit 144 for signal processing, to the image compressing unit 145 for compression, to the large-capacity storage unit 148 for internal storage, or to the image processing unit 92 for the above-described correction processing (synthesizing processing). The large-capacity storage unit 148 stores the data supplied thereto.

The control signal bus 151 is used for exchanging control signals generated at the controller 141, responses from the respective units to be supplied to the controller 141, and so forth. The image data bus 152 is used for exchanging image data before various types of processing are performed, of following various types of processing having been performed.

Next, the operations of the still image photography camera 131 will be described.

In the event that the user has instructed taking of an image, the image-taking unit 91 consecutively takes multiple images, and supplies these to the image processing unit 92. As described above, the image processing unit 92 performs predetermined coefficient multiplication processing and synthesizing processing on the multiple image data frames supplied thereto, generates a corrected image wherein distortion of the subject generated by focal lane shutter effects has been corrected, and supplies this to the picture signal processing unit 144.

The picture signal processing unit 144 receives the image data frame which has been corrected, i.e., subjected to the above-described synthesizing processing, from the image processing unit 92, and based on control of the controller 141 supplied via the control signal bus 151, performs necessary predetermined processing such as gamma conversion for example, and supplies the image data frame to the display unit 146 via the image data bus 152. The display unit 146 displays the supplied image data frame.

In the event that the user, who has viewed the displayed image data frame, instructs saving of the image, the image data frame subjected to the above-described synthesizing processing is compressed as necessary at the image compressing unit 145, and is supplied to and saved at the large-capacity storage unit 148 via the image data bus 152. Also, in the event that the user instructs external output of the image, the image data frame subjected to the above-described synthesizing processing is compressed as necessary at the image compressing unit 145, and is supplied via the image data bus 152 to the external interface 147 and is supplied to an external device.

Next, image-taking processing for still images performed by the still image photography camera 131 will be described with reference to the flowchart in FIG. 21.

In step S1, the controller 141 determines whether or not taking of a still image has been instructed. In the event that determination is made in step S1 that taking of a still image has been instructed, the flow advances to the later-described step S6.

In the event that determination is made in step S1 that taking of a still image has not been instructed, the flow advances to step S2, where the controller 141 determines whether or not the user has instructed changing of the number of synthesizing frames, based on signals supplied from the user interface 143.

In the event that determination is made in step S2 that the user has instructed changing of the number of synthesizing frames, in step S3 the controller 141 generates a control signal for changing the settings of the number of synthesizing frames based on signals supplied from the user interface 143, and supplies to the image processing unit 92 and image-taking unit 91 via the control signal bus 151. Settings for the number of synthesizing frames are changed at the image processing unit 92 and image-taking unit 91.

In the event that determination is made in step S2 that the user has not instructed changing of the number of synthesizing frames, or in the event that processing of step S3 has been completed, the flow proceeds to step S4, where the controller 141 determines whether or not the user has instructed changing of settings of coefficients used for multiplication processing for image correction, based on signals supplied from the user interface 143.

In the event that determination is made in step S4 that the user has instructed changing of settings of coefficients, in step S5 the controller 141 generates a control signal for changing the settings of the coefficients based on signals supplied from the user interface 143, and supplies to the image processing unit 92 via the control signal bus 151. The image processing unit 92 changes the coefficient settings, and the processing ends. Note that the coefficients can be suitably set according to the depending on the speed of motion of the subject, the speed of motion of the camera, the shutter speed, and the frame rate.

In the event that determination is made in step S1 that taking of a still image has been instructed, in step S6 the image-taking unit 91 and image processing unit 92 obtain settings regarding the number of synthesizing frames.

In step S7, the image processing unit 92 obtains coefficient settings.

In step S8, the image-taking unit 91 executes image-taking of a predetermined number of frames, and supplies the image data of the taken predetermined number of frames to the image processing unit 92.

Figure 22:
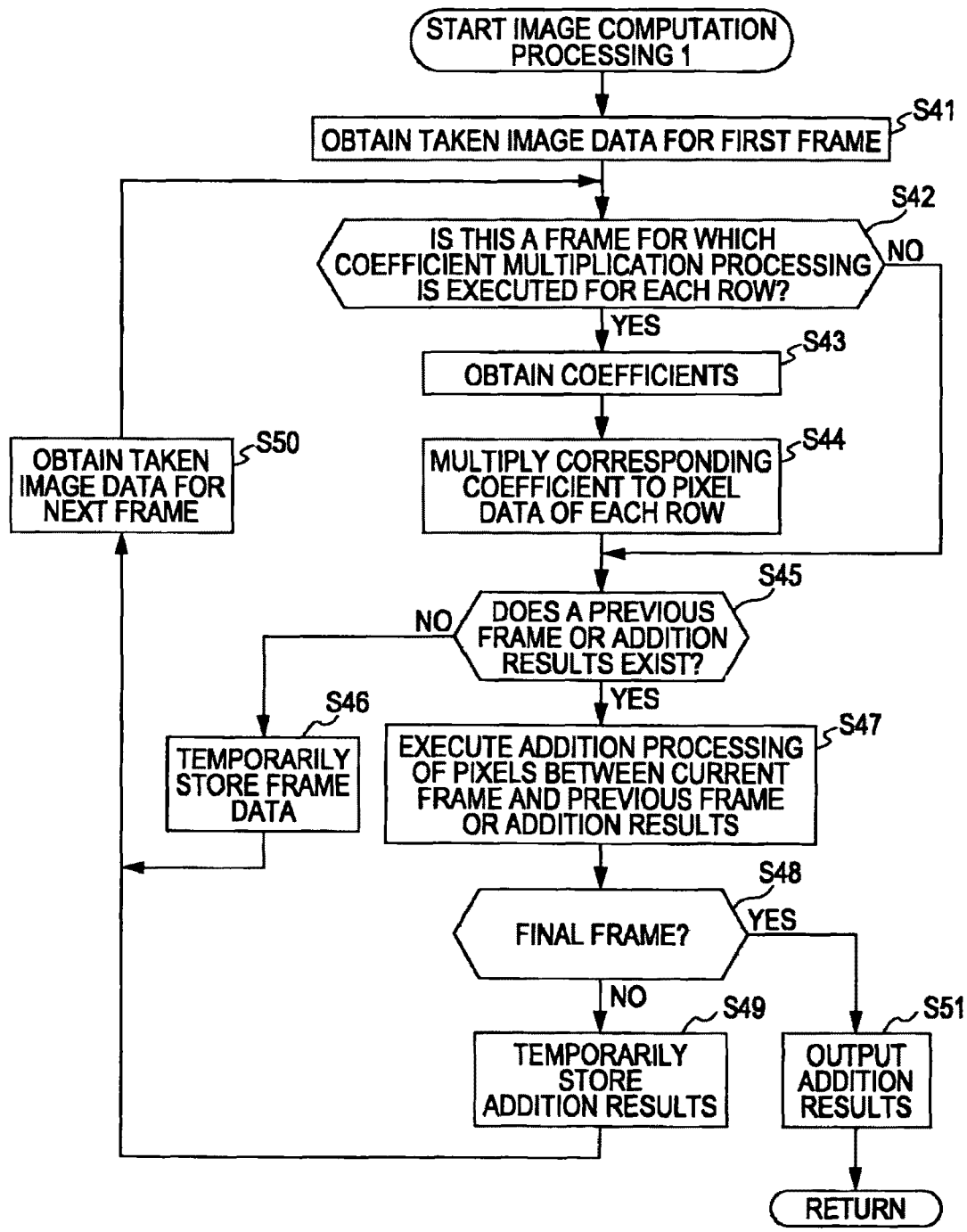
FIG. 22 is a flowchart for describing image computation processing 1.

In step S9, Image Computation Processing 1, described later with reference to FIG. 22, is performed.

In step S10, the controller 141 controls supply to the display unit 146 of the computation results obtained by the image computation processing executed in step S9 that are output from the image processing unit 92, i.e., the corrected image, subjected to processing at the picture signal processing unit 144 as necessary.

In step S11, the controller 141 determines whether or not the user has instructed storage of computation results, based on the signals supplied from the user interface 143.

In step S11, in the event that determination is made that the user has instructed storage of computation results, in step S12 the controller 141 supplies the computation results to the image compressing unit 145 for compression processing if necessary, and then supplies to the large-capacity storage unit 148. The large-capacity storage unit 148 stores the supplied computation results.

In step S11, in the event that determination is made that the user has not instructed storage of computation results, or following completion of the processing of step S12, the flow proceeds to step S13, where the controller 141 determines whether or not the user has instructed external output of computation results, based on the signals supplied from the user interface 143. In the event that determination is made that the user has not instructed external output of computation results, the processing ends.

In step S13, in the event that determination is made that the user has instructed external output of computation results, in step S14 the controller 141 supplies the computation results to the image compressing unit 145 for compression processing if necessary, and then supplies to the external interface 147. The external interface 147 outputs the computation results supplied thereto to an external device, and the processing ends.

Due to such processing, image data which has been taken and corrected is displayed, and is internally stored or output to external devices based on input user operations.

Next, the Image Computation Processing 1 performed in step S9 in FIG. 21 will be described with reference to the flowchart in FIG. 22.

In step S41, the pre-processing unit 101 supplies the first frame of taken image data to the multiplying unit 102. The multiplying unit 102 acquires the first frame of taken image data.

In step S42, the multiplying unit 102 determines whether or not the supplied frame is a frame wherein coefficient multiplication processing is to be preformed for each row. In the event that determination is made in step S42 that the supplied frame is not a frame wherein coefficient multiplication processing is to be preformed for each row, the processing advances to the later-described step S45.

In the event that determination is made in step S42 that the supplied frame is a frame wherein coefficient multiplication processing is to be preformed for each row, in step S43 the multiplying unit 102 obtains corresponding coefficients stored in the coefficient storage unit 103.

In step S44, the multiplying unit 102 multiplies the pixel data of each row by the corresponding coefficients. As a result, a data frame such as described with FIG. 17A or 17C is generated, for example.

In the event that determination is made in step S42 that the supplied frame is not a frame wherein coefficient multiplication processing is to be preformed for each row, or following the processing in step S44, the flow proceeds to step S45, where the adding unit 104 receives supply of the data frame from the multiplying unit 102, and determination is made regarding whether or not a previous frame or addition results exist in the temporary image storage unit 105.

Specifically, in the event that the adding unit 104 receives supply of a data frame corresponding to the first frame from the multiplying unit 102, there is no data frame present in the temporary image storage unit 105. In the event that the adding unit 104 receives supply of a data frame corresponding to the second frame from the multiplying unit 102, there is a data frame present in the temporary image storage unit 105, which corresponds to the first frame (multiplied by predetermined coefficients as necessary). In the event that the adding unit 104 receives supply of a data frame corresponding to the third frame from the multiplying unit 102, there is in the temporary image storage unit 105 the addition results of past image data frames which have been added by the adding unit 104.

In the event that determination is made in step S45 that neither a previous frame nor addition results exists in the temporary image storage unit 105, in step S46 the adding unit 104 supplies the data of the frame to the temporary image storage unit 105 without change. The temporary image storage unit 105 temporarily stores the image data frame supplied thereto, and the flow advances to the later-described step S50.

In the event that determination is made in step S45 that either a previous frame or addition results exists in the temporary image storage unit 105, in step S47 the adding unit 104 executes addition processing of the pixels between the current frame supplied from the multiplying unit 102 (the frame data may have been multiplied by predetermined coefficients as necessary, or may not) and the previous frame or addition results in the temporary image storage unit 105.

In step S48, the adding unit 104 determines whether the current frame supplied from the multiplying unit 102, which has been subjected to the adding processing, is the final frame of the multiple image data frames synthesized for performing correction.

In the event that determination is made in step S48 that the current frame is not the final frame, in step S49 the adding unit 104 supplies the addition results to the temporary image storage unit 105. The temporary image storage unit 105 temporarily stores the image data frame supplied thereto.

Following the processing of step S46 or step S49, in step S50 the pre-processing unit 101 supplies taken image data of the next frame to the multiplying unit 102. The multiplying unit 102 acquires the next frame of taken image data, and the flow returns to step S42, where the subsequent processing is repeated.

Figure 21:
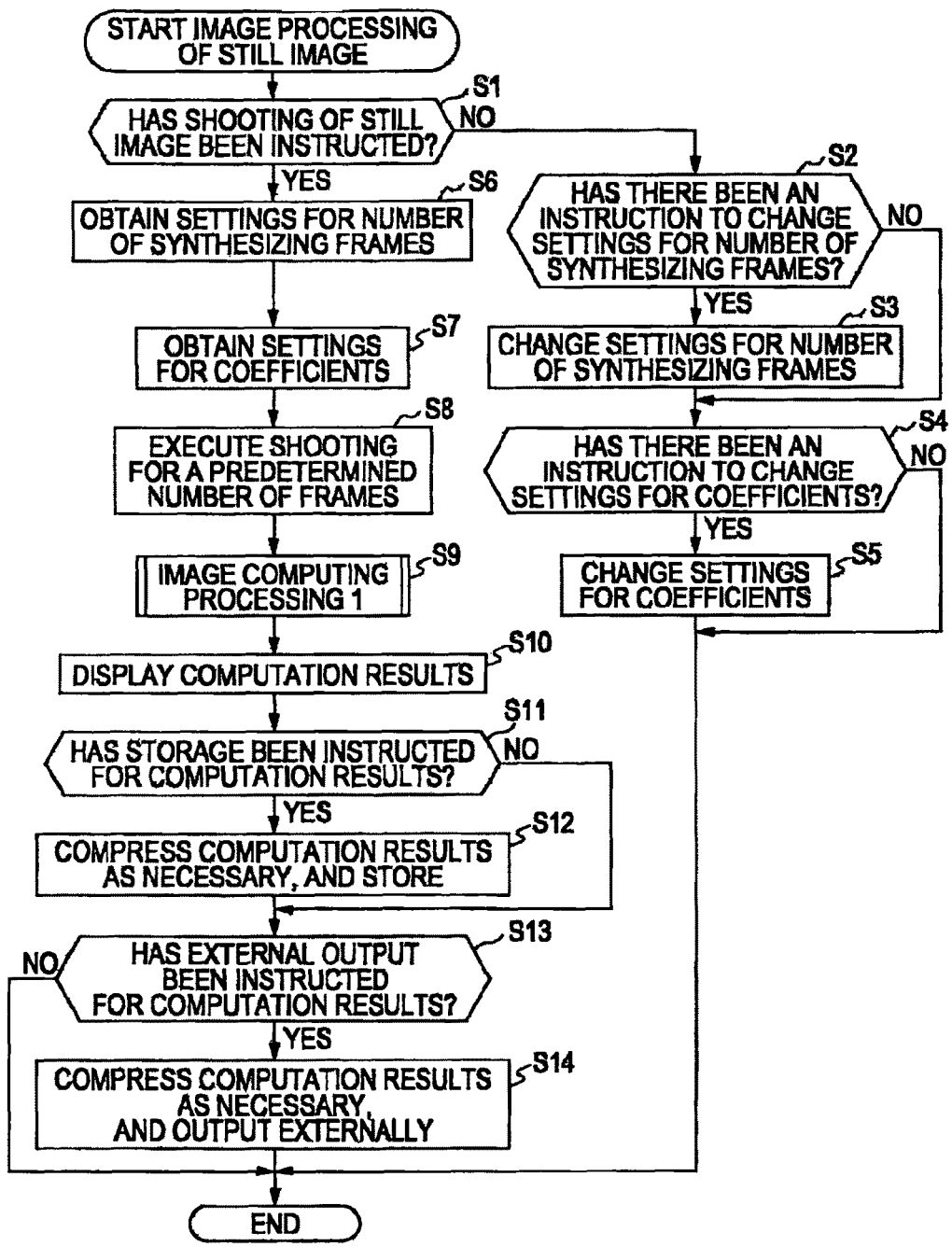
FIG. 21 is a flowchart for describing image-taking processing of a still image.

In the event that determination is made in step S48 that the current frame is the final frame, in step S51 the adding unit 104 outputs the addition results, and the flow returns to step S9 in FIG. 21, and proceeds to step S10.

Due to such processing, multiplying predetermined coefficients as necessary on multiple continuous taken images taken which have a distorted subject owing to focal plane shutter effects generates image data frames used for generating a corrected image as described with FIGS. 17A through 17C, and synthesizing these yields image data wherein subject distortion occurring due to focal plane shutter effects appears to have been corrected, as described with reference to FIG. 18, for example.

Now, the greater the number of images that are synthesized, the more corrected the distortion of the subjected in the image data generated by synthesizing appears. However, the greater the number of images that are synthesized, there is so-called blurring in images of moving subjects (or subjects which appear to move in the screen due to the camera moving). This blurring can be suppressed well by raising the frame rate as much as possible when taking the images to be synthesized. For example, the blurring occurring in a corrected image obtained in a case of using three image data frames taken at a frame rate three times the shutter speed of a normal digital still camera and performing synthesizing processing is approximately equivalent to the blurring occurring in a normal digital still camera.

Figure 20:
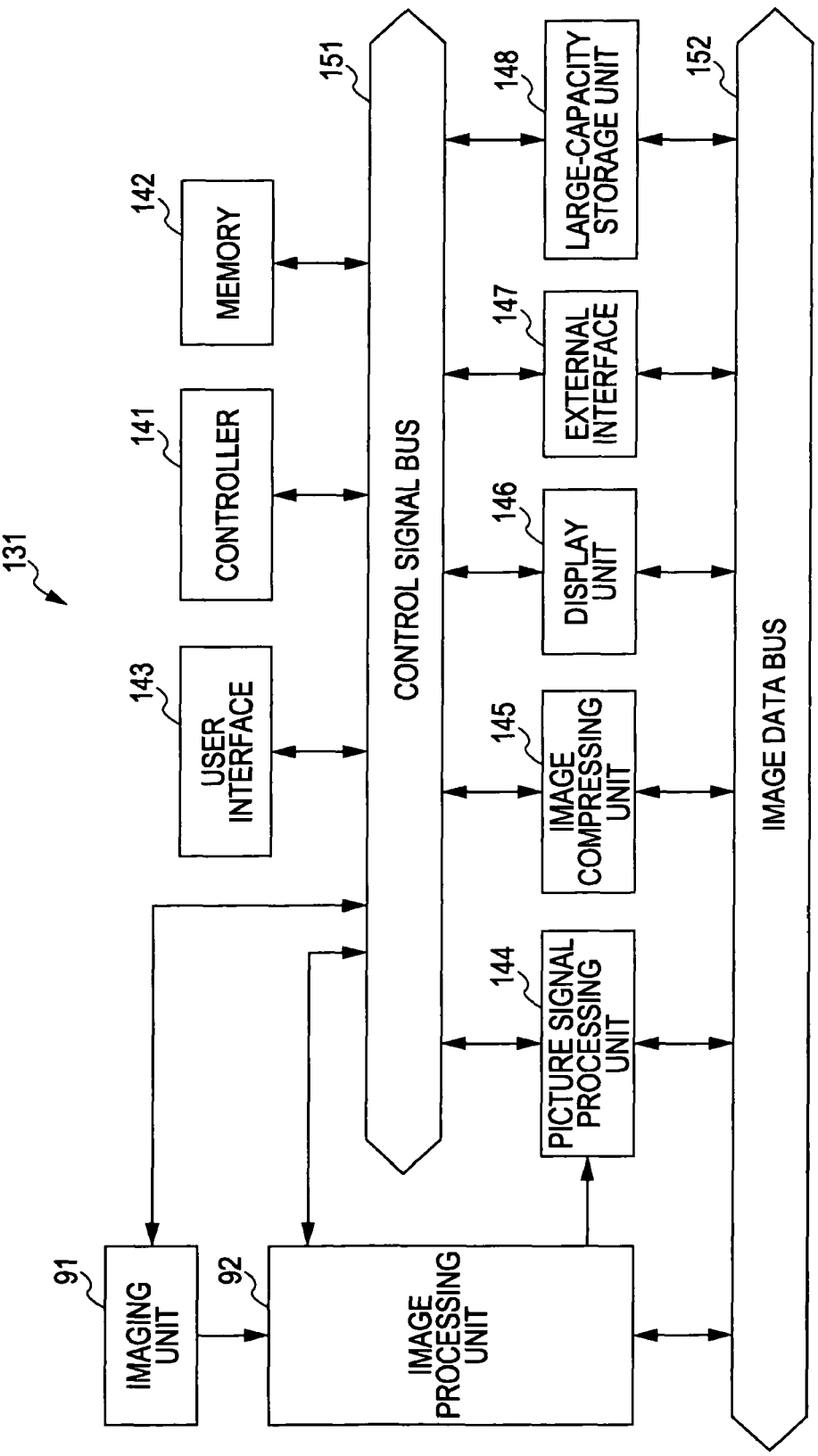
FIG. 20 is a block diagram illustrating the configuration of a still-photography camera (digital still camera)

Note that while FIGS. 21 and 22 describe the processing executed in the still image photography camera 131 described with FIG. 20, processing performed in the image processing device 81 described with FIG. 9 is basically the same processing as the Image Computation Processing 1 described with FIG. 22.

Next, a device and processing for correcting subject distortion similarly occurring in moving images due to focal plane shutter effects will be described.

Video images can be displayed by consecutively displaying image data frames, so subject distortion occurring in moving images due to focal plane shutter effects in the same way as with still images can be corrected by applying the above-described case of still images so as to correct each frame making up the moving images. That is to say, if a moving image can be displayed as a continuation of corrected image data, generated by the multiple continuous taken images taken with distorted subjects due to focal plane shutter effects having been multiplied by predetermined coefficients as necessary as described with reference to FIGS. 17A through 18, distortion of subjects due to focal plane shutter effects can be corrected with cases of taking moving images, as well.

FIG. 23 is a block diagram illustrating the configuration of an image processing device 201 for correcting subject distortion due to focal plane shutter effects in cases of taking moving images.

Note that the components which correspond to those in FIG. 9 are denoted with the same reference numerals, and description thereof will be omitted as appropriate.

The image-taking unit 91 is capable of taking continuous images at a frame rate faster than the shutter speed of normal digital still cameras (e.g., 1/60 seconds), around four times as fast for example (e.g., 1/240 seconds). Image signals taken by the image-taking unit 91 have different exposure timings for each row, so distortion occurs in taken images due to focal plane shutter effects.

Image signals taken by the image-taking unit 91 are supplied to an image processing unit 211. It is needless to say that the image processing unit 211 can acquire and process image data recorded in another device.

In the event of acquiring and processing image data recorded in another device, the acquired image data is a group of images in a series, taken continuously. The group of images in a series may either be so called RAW format data which has been taken by an image-taking device like the image-taking device used in the image-taking unit 91 and with the image signals thereof remaining unprocessed, i.e., simply digitized electric signals obtained form the image-taking device, or may be image data which is obtained by the RAW format data having been subjected to processing so as to be viewable as an image.

The image processing unit 211 is configured of a pre-processing unit 101 and coefficient storage unit 103 as with the arrangement shown in FIG. 9, and further a selecting unit 231, #1 temporary image storage unit 232-1 through #k temporary image storage unit 232-k, #1 multiplying unit 233-1 through #k multiplying unit 233-k, and adding unit 234.

In the case of still images, one frame of corrected image data is generated form multiple taken images, so a case of using one taken image for generating other corrected image data as well was not taken into consideration, but in the event of displaying corrected moving images using continuous corrected image data, one taken image data is used multiple times for synthesizing processing of multiple image data frames making up a moving image. That is to say, in a case of correcting still images, image data already used for synthesizing processing can be discarded, but in the case of moving images, images already used still need to be cyclically used in the synthesizing processing, so there is the need to have storage units for storing each of the multiple taken images.

Accordingly, the selecting unit 231 distributes the image signals supplied form the pre-processing unit 101 to the #1 temporary image storage unit 232-1 through #k temporary image storage unit 232-k. Now, the number Y of image data frames used for correcting each frame making up the moving image data is a positive integer which is equal to k or smaller than k, and the selecting unit 231 sequentially supplies the image signals supplied from the pre-processing unit 101 to #1 temporary image storage unit 232-1 through #Y temporary image storage unit 232-Y, one frame at a time in order.

The #1 temporary image storage unit 232-1 through #k temporary image storage unit 232-k are storage units each capable of holding image signals for one frame, and temporarily store the supplied image signals (image signals prior to synthesizing). That is to say, upon receiving supply of new image signals from the selecting unit 231, the #1 temporary image storage unit 232-1 through #k temporary image storage unit 232-k overwrite the new image signals on the image signals already stored.

The #1 multiplying unit 233-1 through #k multiplying unit 233-k read out corresponding multiplying coefficients stored in the coefficient storage unit 103 as necessary, and if necessary, multiply the coefficients on the image signals stored in the #1 temporary image storage unit 232-1 through #k temporary image storage unit 232-k, and if not necessary, supply the data in the #1 temporary image storage unit 232-1 through #k temporary image storage unit 232-k to the adding unit 234 without performing multiplication processing.

The coefficients which the #1 multiplying unit 233-1 through #k multiplying unit 233-k read out from the coefficient storage unit 103 depend on which number-in-order of the multiple frames for synthesizing the one frame of image data frame in the moving image, that the frame to be subjected to multiplication processing by that multiplying unit is.

For example, in a case wherein one image data frame of the moving image is to be corrected by synthesizing Y frames of image data frame, with a coefficient a being multiplied to the first of the frames to be synthesized, and a coefficient (1−a) multiplied to the last of the frames, each of the #1 multiplying unit 233-1 through #k multiplying unit 233-k operates such that, in the event that the frame which the multiplying unit itself is to perform multiplication processing on is the first frame of the frames to be synthesized, that multiplying unit reads out the coefficient a from the coefficient storage unit 103 and executes the multiplication processing, and supplies the multiplication results to the adding unit 234. Also, each of the #1 multiplying unit 233-1 through #k multiplying unit 233-k operates such that, in the event that the frame which the multiplying unit itself is to perform multiplication processing on is the Y'th frame of the frames to be synthesized, that multiplying unit reads out the coefficient (1−a) from the coefficient storage unit 103 and executes the multiplication processing, and supplies the multiplication results to the adding unit 234. Further, each of the #1 multiplying unit 233-1 through #k multiplying unit 233-k operates such that, in the event that the frame which the multiplying unit itself is to perform multiplication processing on is neither the first frame of the frames to be synthesized nor the Y'th frame, that multiplying unit does not read out a coefficient from the coefficient storage unit 103, but rather and supplies the image data frame, which has not been subjected to multiplication processing, to the adding unit 234.

The adding unit 234 adds the pixel values of each pixel in the image data frames supplied from the #1 multiplying unit 233-1 through #k multiplying unit 233-k (some image data frames have been subjected to multiplication processing, others have not), and outputs the synthesize image data frame obtained as the result of addition.

Figure 24:
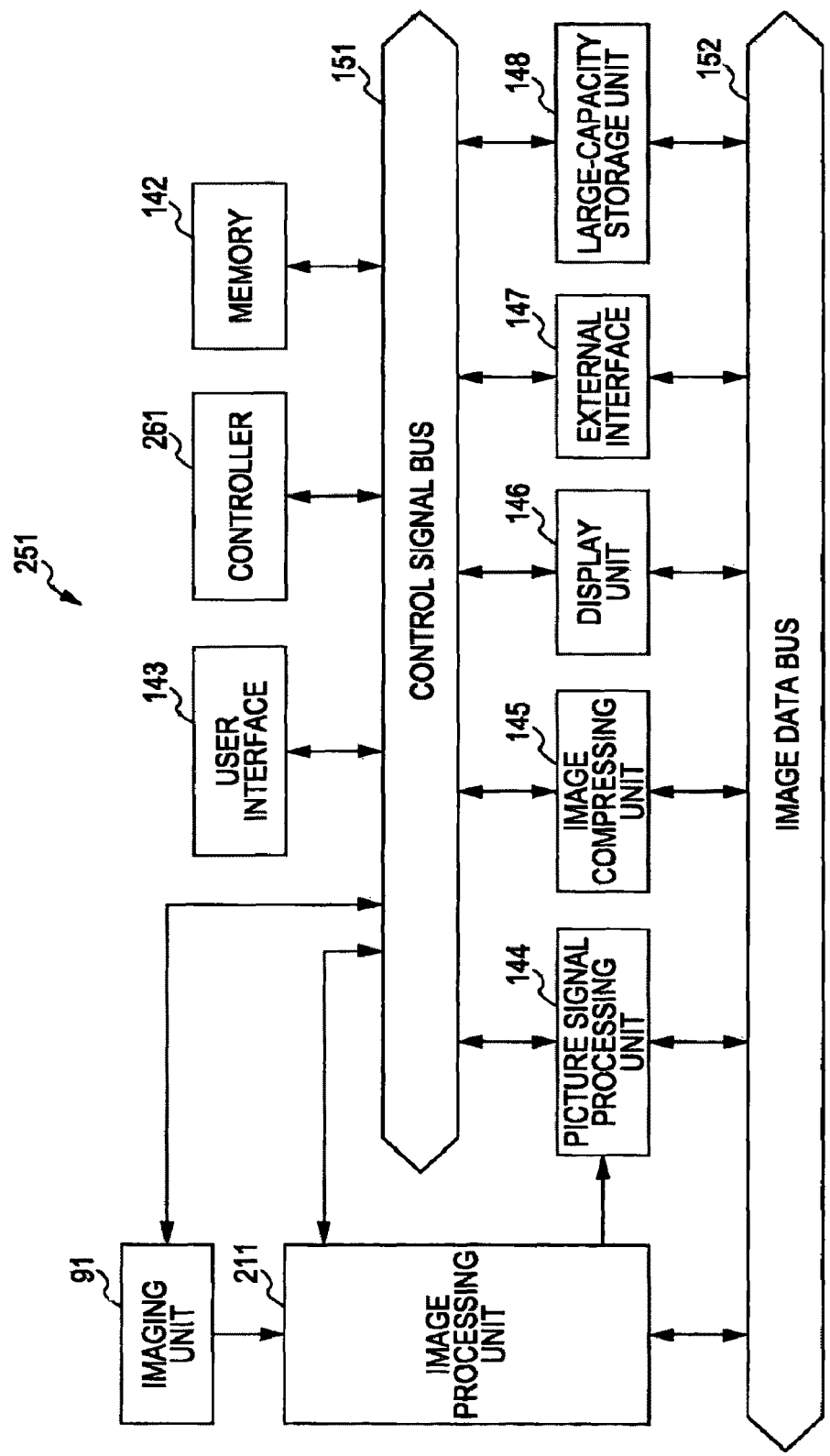
FIG. 24 is a block diagram illustrating the configuration of a motion-photography camera (digital video camera)

FIG. 24 illustrates a configuration example of a moving image photography camera (digital video camera) 251 to which the above-described image processing device 201 has been applied.

Note that the components which correspond to those in FIG. 20 are denoted with the same reference numerals, and description thereof will be omitted as appropriate.

The moving image photography camera 251 shown in FIG. 24 has basically the same configuration as that of the still image photography camera (digital still camera) 131 described with FIG. 20, except for an image processing unit 211 being provided in stead of the image processing unit 81, and a controller 261 being proceeded instead of the controller 141.

The controller 261 controls the operations of the moving image photography camera 251 based on user operation input supplied from the user interface 143. The controller 261 is connected to the various units via the control signal bus 151.

Next, the processing which the image processing unit 211 shown in FIG. 23 or FIG. 24 executes will be described in time sequence with reference to FIG. 25.

Image data frames which have been taken or externally supplied will be referred to, in time-sequence, as image data frames F1, F2, F3, . . . F(k−1), Fk, F(k+1), and so on.

In the same way as with the base described above, if we say that there are M rows of pixels in the entire image (i.e., that the vertical number of pixels is M pixels) for the image data frame taken at the earliest point-in-time of the image data frames to be synthesized, the coefficient "a" multiplied on each pixel value of each row may be such that, for example, coefficient a=0 for the pixels of the first row, coefficient a=1/M for the pixels of the next row, coefficient a=2/M for the pixels of the next row, and so on, with the coefficient being incremented by 1/M, such that at the final row, the coefficient is (M−1)/M=1. The coefficient a corresponding to the respective rows is multiplied on the pixel values of each pixel of each row in the first image data frame F1. That is to say, due to multiplication processing being performed on the first image data frame F1, image frame data can be obtained which is lighter toward the leading row and closer to normal concentration closer to the last row.

First, let us consider a case wherein the image data frame F1 is stored in the #1 temporary image storage unit 232-1 by a certain point-in-time, and subsequently, image data frames F2, . . . , F(k−1), and Fk are stored in #2 temporary image storage unit 232-2 through #k temporary image storage unit 232-k.

Now, the #1 multiplying unit 233-1 reads out the coefficient a stored in the coefficient storage unit 103 and multiples this on the image data frame F1 stored in the #1 temporary image storage unit 232-1, and supplies the multiplication results to the adding unit 234. Next, the #2 multiplying unit 233-2 does not read out a coefficient from the coefficient storage unit 103, either does not multiply anything or multiplies 1 on the image data frame F2 stored in the #2 temporary image storage unit 232-2, and supplies the multiplication results to the adding unit 234. In the same way, the #3 multiplying unit 233-3 through #(k−1) multiplying unit 233-(k−1) do not read out a coefficient from the coefficient storage unit 103, either do not multiply anything or multiply 1 on the image data frames stored in the #3 temporary image storage unit 232-3 through #(k−1) temporary image storage unit 232-(k−1), and supply the image data frames without change to the adding unit 234. Finally, the #k multiplying unit 233-k reads out the coefficient (1−a) stored in the coefficient storage unit 103 and multiples this on the image data frame Fk stored in the #k temporary image storage unit 232-k, and supplies the multiplication results to the adding unit 234.

At the adding unit 234, the supplied image data frames are added (the pixel values of the pixels are added), and the addition results aF1+F2+ . . . +F(k−1)+(1−a)Fk are output.

Next, in the event that the image data frame F(k+1) taken at the subsequent point-in-time is supplied from the pre-processing unit 101, the selecting unit 231 supplies to the #1 temporary image storage unit 232-1 through #k temporary image storage unit 232-k holding the oldest image, i.e., to the #1 temporary image storage unit 232-1, the new image data frame F(k+1).

Then, the #2 multiplying unit 233-2 reads out the coefficient a stored in the coefficient storage unit 103 and multiples this on the image data frame F2 stored in the #2 temporary image storage unit 232-2, and supplies the multiplication results to the adding unit 234. Next, the #3 multiplying unit 233-3 does not read out a coefficient from the coefficient storage unit 103, either does not multiply anything or multiplies 1 on the image data frame F3 stored in the #3 temporary image storage unit 232-3, and supplies the multiplication results to the adding unit 234. In the same way, the #4 multiplying unit 233-4 through #k multiplying unit 233-k do not read out a coefficient from the coefficient storage unit 103, either do not multiply anything or multiply 1 on the image data frames stored in the #4 temporary image storage unit 232-4 through #k temporary image storage unit 232-k, and supply the multiplication results to the adding unit 234. Finally, the #1 multiplying unit 233-1 reads out the coefficient (1−a) stored in the coefficient storage unit 103 and multiples this on the image data frame F(k+1) stored in the #1 temporary image storage unit 232-1, and supplies the multiplication results to the adding unit 234.

At the adding unit 234, the supplied image data frames are added (the pixel values of the pixels are added), and the addition results aF2+F3+ . . . +Fk+(1−a)F(k+1) are output.

Subsequently, in the event that the image data frame F(k+2) taken at the next point-in-time is supplied from the pre-processing unit 101, the selecting unit 231 supplies to the #1 temporary image storage unit 232-1 through #k temporary image storage unit 232-k holding the oldest image, i.e., to the #2 temporary image storage unit 232-2 where the image data frame F2 is stored, the new image data frame F(k+2).

Thereafter, in the same way, the image data frame taken at the oldest point-in-time at that point-in-time is multiplied by the coefficient a, the image data frame taken at the newest point-in-time at that point-in-time is multiplied by the coefficient (1−a), and the pixel values of the image data frames are each added, thereby generating and outputting a corrected image data frame (e.g., an image data frame corresponding to a corrected image assuming a taken image taken with global shutter operations of exposure as shown as the section α in FIG. 10) making up the moving image.

Figure 26:
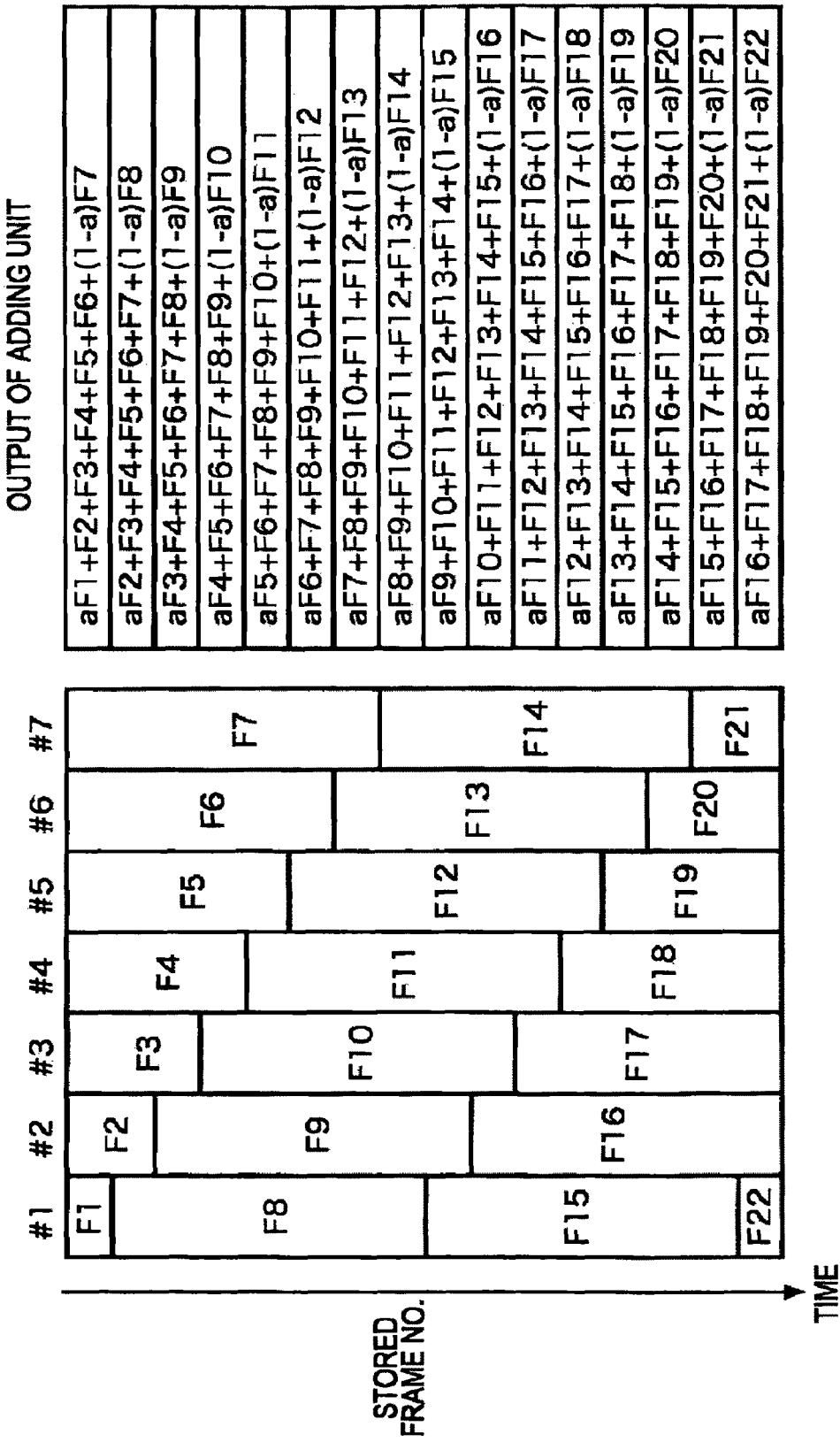
FIG. 26 is a diagram for describing coefficient multiplication processing and addition processing with regard to an image data frame.

Also, FIG. 26 illustrates a specific example wherein the number of image data frames k to be used for synthesizing is set to k=7.

First, let us consider a case wherein the image data frame F1 is stored in the #1 temporary image storage unit 232-1 by a certain point-in-time, and subsequently, image data frames F2, F6, and F7 are stored in #2 temporary image storage unit 232-2 through #7 temporary image storage unit 232-7.

Now, the #1 multiplying unit 233-1 reads out the coefficient a stored in the coefficient storage unit 103 and multiples this on the image data frame F1 stored in the #1 temporary image storage unit 232-1, and supplies the multiplication results to the adding unit 234. Next, the #2 multiplying unit 233-2 does not read out a coefficient from the coefficient storage unit 103, either does not multiply anything or multiplies 1 on the image data frame F2 read out from in the #2 temporary image storage unit 232-2, and supplies the image data frame to the adding unit 234. In the same way, the #3 multiplying unit 233-3 through #6 multiplying unit 233-6 do not read out a coefficient from the coefficient storage unit 103, either do not multiply anything or multiply 1 on the image data frames read out from the #3 temporary image storage unit 232-3 through #6 temporary image storage unit 232-6, and supply the image data frames to the adding unit 234. Finally, the #7 multiplying unit 233-7 reads out the coefficient (1−a) stored in the coefficient storage unit 103 and multiples this on the image data frame F7 stored in the #7 temporary image storage unit 232-7, and supplies the multiplication results to the adding unit 234.

At the adding unit 234, the supplied image data frames are added (the pixel values of the pixels are added), and the addition results aF1+F2+ . . . +F6+(1−a)F7 are output.

Next, in the event that the image data frame F8 taken at the subsequent point-in-time is supplied from the pre-processing unit 101, the selecting unit 231 supplies to the #1 temporary image storage unit 232-1 through #7 temporary image storage unit 232-7 holding the oldest image, i.e., to the #1 temporary image storage unit 232-12 where the image data frame F1 is stored, the new image data frame F8.

Now, the #2 multiplying unit 233-2 reads out the coefficient a stored in the coefficient storage unit 103 and multiples this on the image data frame F2 stored in the #2 temporary image storage unit 232-2, and supplies the multiplication results to the adding unit 234. In the same way, the #3 multiplying unit 233-3 through #7 multiplying unit 233-7 do not read out a coefficient from the coefficient storage unit 103, either do not multiply anything or multiply 1 on the image data frames stored in the #3 temporary image storage unit 232-3 through #7 temporary image storage unit 232-7, and supply the multiplication results to the adding unit 234. Finally, the #1 multiplying unit 233-1 reads out the coefficient (1−a) stored in the coefficient storage unit 103 and multiples this on the image data frame F8 stored in the #1 temporary image storage unit 232-1, and supplies the multiplication results to the adding unit 234.

At the adding unit 234, the supplied image data frames are added (the pixel values of the pixels are added), and the addition results aF2+F3+ . . . +F7+(1−a)F8 are output.

Subsequently, in the event that an image data frame F9 taken at the next point-in-time is supplied from the pre-processing unit 101, the selecting unit 231 supplies to the #1 temporary image storage unit 232-1 through #7 temporary image storage unit 232-7 holding the oldest image, i.e., to the #2 temporary image storage unit 232-2, the new image data frame F9.

Thereafter, in the same way, the image data frame taken at the oldest point-in-time at that point-in-time is multiplied by the coefficient a, the image data frame taken at the newest point-in-time at that point-in-time is multiplied by the coefficient (1−a), and the pixel values of the image data frames are each added, thereby generating and outputting a corrected image data frame (e.g., an image data frame corresponding to a corrected image assuming a taken image taken with global shutter operations of exposure as shown as the section α in FIG. 10), making up the moving image.

Figure 25:
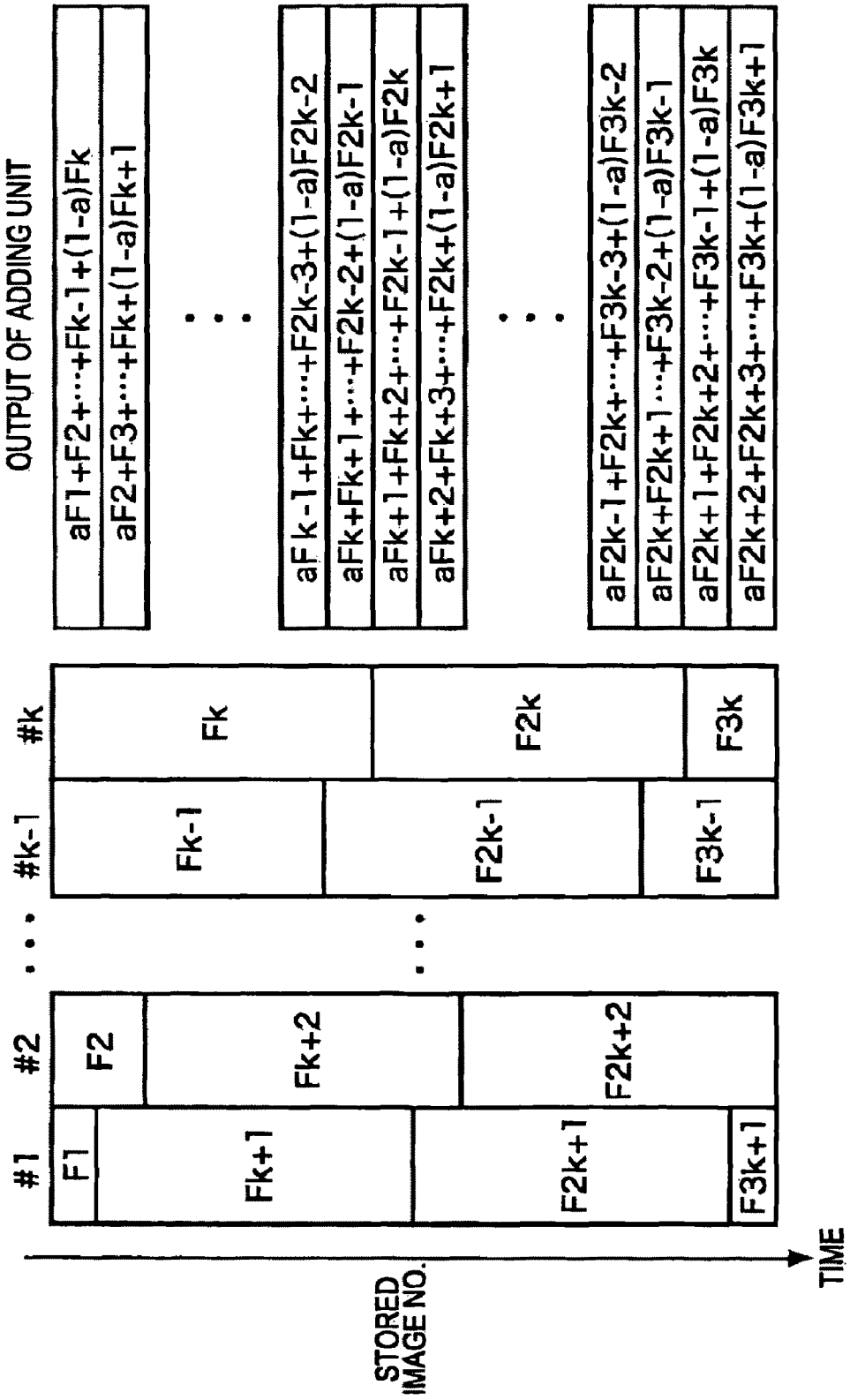
FIG. 25 is a diagram for describing coefficient multiplication processing and addition processing with regard to an image data frame.

Now, the processing in FIG. 25 and FIG. 26 has been described with the image data frame taken at the oldest point-in-time being multiplied by the coefficient a, and the image data frame taken at the newest point-in-time being multiplied by the coefficient (1−a), but it is needless to say that the present embodiment is not restricted to this arrangement, and that arrangements may be made wherein three or more optional image data frames, or all image data frames for that matter, are multiplied by optionally set coefficients, as necessary, so as to carry out correction processing different from that described above with FIG. 15.

Next, the image-taking processing of moving images executed at the moving image photography camera 251 will be described with reference to the flowchart in FIG. 27.

In step S81, the controller 261 determines whether or not taking of moving images has been instructed. In the event that determination is made in step S81 that taking of moving images has not been instructed, the flow advances to step S82, and in the event that determination is made in step S81 that taking of moving images has been instructed, the flow advances to step S86.

In steps S82 through S87, processing basically the same as that of steps S2 through S7 described with FIG. 21 is performed.

That is to say, in the event that determination is made that taking of moving images has not been instructed, determination is made regarding whether or not the user has instructed changing of the settings of the number of synthesizing frames, and in the event that determination is made that the user has instructed changing of the settings of the number of synthesizing frames, the settings for the number of synthesizing frames are changed, determination is made regarding whether or not the user has instructed changing coefficient settings, and in the event that determination is made that the user has instructed changing of the coefficient settings, the coefficient settings are changed.

In the event that determination is made that taking of moving images has been instructed, the settings for the number of synthesizing frames are obtained, and coefficient settings are obtained.

In step S88, the image-taking unit 91 starts image-taking, and supplies image data acquired by image-taking to the image-processing unit 211.

Figure 28:
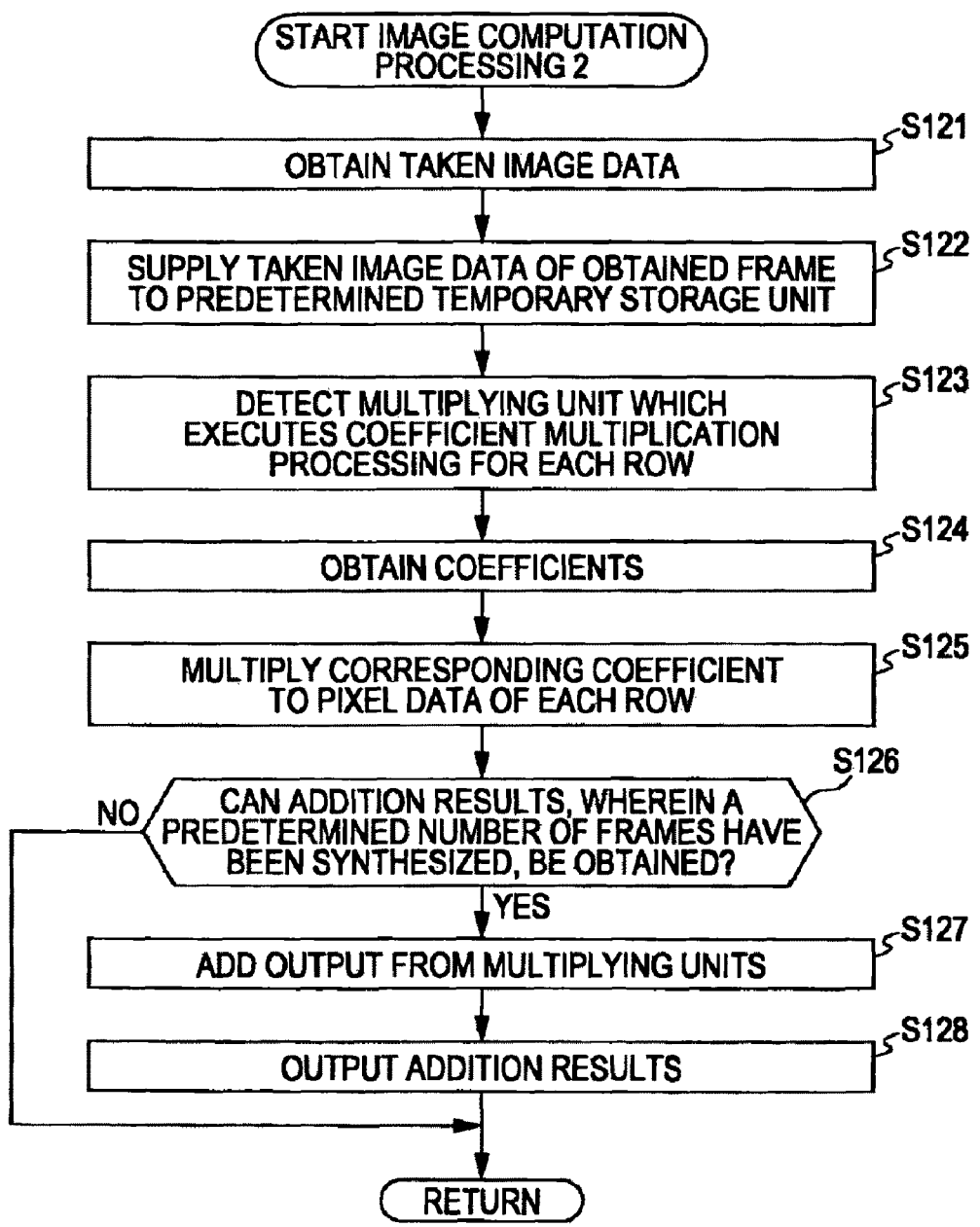
FIG. 28 is a flowchart for describing image computation processing 2.

In step S89, Image Computation Processing 2 described later with reference to FIG. 28 is executed.

In step S90, the controller 261 determines whether or not computation results have been obtained from the image processing unit 211. In the event that determination is made in step S90 that computation results have not been obtained, the flow returns to step S89, and the subsequent processing is repeated.

In the event that determination is made in step S90 that computation results have been obtained, in step S91, the controller 261 controls supply to the display unit 146 of the computation results obtained by the image computation processing executed in step S89 that are output from the image processing unit 211, i.e., the corrected image data frames making up the video image, subjected to processing at the picture signal processing unit 144 as necessary. The display unit 146 displays the image data which is the supplied computation results, i.e., the above-described corrected images.

In step S92, the controller 261 determines whether or not the user has instructed starting or stopping of storage of computation results, based on the signals supplied from the user interface 143.

In step S92, in the event that determination is made that the user has instructed starting or stopping of storage of computation results, in step S93 the controller 261 supplies the computation results to the image compressing unit 145 for compression processing if necessary, and then supplies to the large-capacity storage unit 148 to start storing, or stores supplying to the large-capacity storage unit 148. The large-capacity storage unit 148 starts or stops storing of the supplied computation results.

In step S92, in the event that determination is made that the user has not instructed starting or stopping of storage of computation results, or following completion of the processing of step S93, the flow proceeds to step S94, where the controller 261 determines whether or not the user has instructed starting or stopping of external output of computation results, based on the signals supplied from the user interface 143. In the event that determination is made that the user has not instructed starting or stopping of external output of computation results, the processing ends.

In step S94, in the event that determination is made that the user has instructed starting or stopping of external output of computation results, in step S95 the controller 261 supplies the computation results to the image compressing unit 145 for compression processing if necessary and then supplies to the external interface 147, or stops supplying of the computation results to the external interface 147. The external interface 147 starts or stops outputting of the computation results supplied thereto to an external device.

In step S96, the controller 261 determines whether or not the user has instructed ending of taking video images, based on the signals supplied from the user interface 143. In step S96, in the event that determination is made that the user has not instructed ending of taking video images, the flow returns to step S89, and subsequent processing is repeated. In the event that determination is made in step S96 that the user has instructed ending of taking video images, the processing ends.

Due to such processing, video images made up of image data which has been taken and corrected is displayed, and is internally stored or output to external devices based on user operations.

Next, the Image Computation Processing 2 executed at step S89 in FIG. 27 will be described with reference to the flowchart in FIG. 28.

In step S121, the pre-processing unit 101 subjects a supplied image data frame to predetermined processing, and then supplies the taken image data to the selecting unit 231. The selecting unit 231 acquires the taken image data.

In step S122, the selecting unit 231 supplies and stores the acquired frame of taken image data to a predetermined temporary storage unit, specifically, the temporary storage unit of the #1 temporary image storage unit 232-1 through #k temporary image storage unit 232-k holding the image taken at the oldest point-in-time at that point-in-time.

In step S123, which of the #1 multiplying unit 233-1 through #k multiplying unit 233-k are to execute coefficient multiplication for each row is determined, regardless of whether the arrangement is such that image data frame taken at the oldest point-in-time being multiplied by the coefficient a and the image data frame taken at the newest point-in-time being multiplied by the coefficient (1−a), or predetermined coefficients are multiplied on three or more image data frames.

In step S124, of the #1 multiplying unit 233-1 through #k multiplying unit 233-k, those which are to execute coefficient multiplication processing obtain corresponding coefficients stored in the coefficient storage unit 103.

In step S125, of the #1 multiplying unit 233-1 through #k multiplying unit 233-k, those to execute coefficient multiplication processing multiply corresponding coefficients on the pixel data of each row. That is to say, data frames such as described with reference to FIGS. 17A and 17C for example, are generated at the corresponding multiplying units.

In step S126, the adding unit 234 determines whether or not addition results wherein a predetermined number of frames have been synthesized can be obtained, i.e., whether or not the predetermined number of frames have already been taken. In the event that determination is made in step S126 that addition results wherein a predetermined number of frames have been totaled have not been obtained, the flow returns to step S89 in FIG. 27, proceeds to step S90, determination is made that computation results have not been obtained, and the flow returns to step S89.

In the event that determination is made in step S126 that addition results wherein a predetermined number of frames have been totaled have been obtained, in step S127 the adding unit 234 executes addition processing of the output supplied from the #1 multiplying unit 233-1 through #k multiplying unit 233-k.

Figure 27:
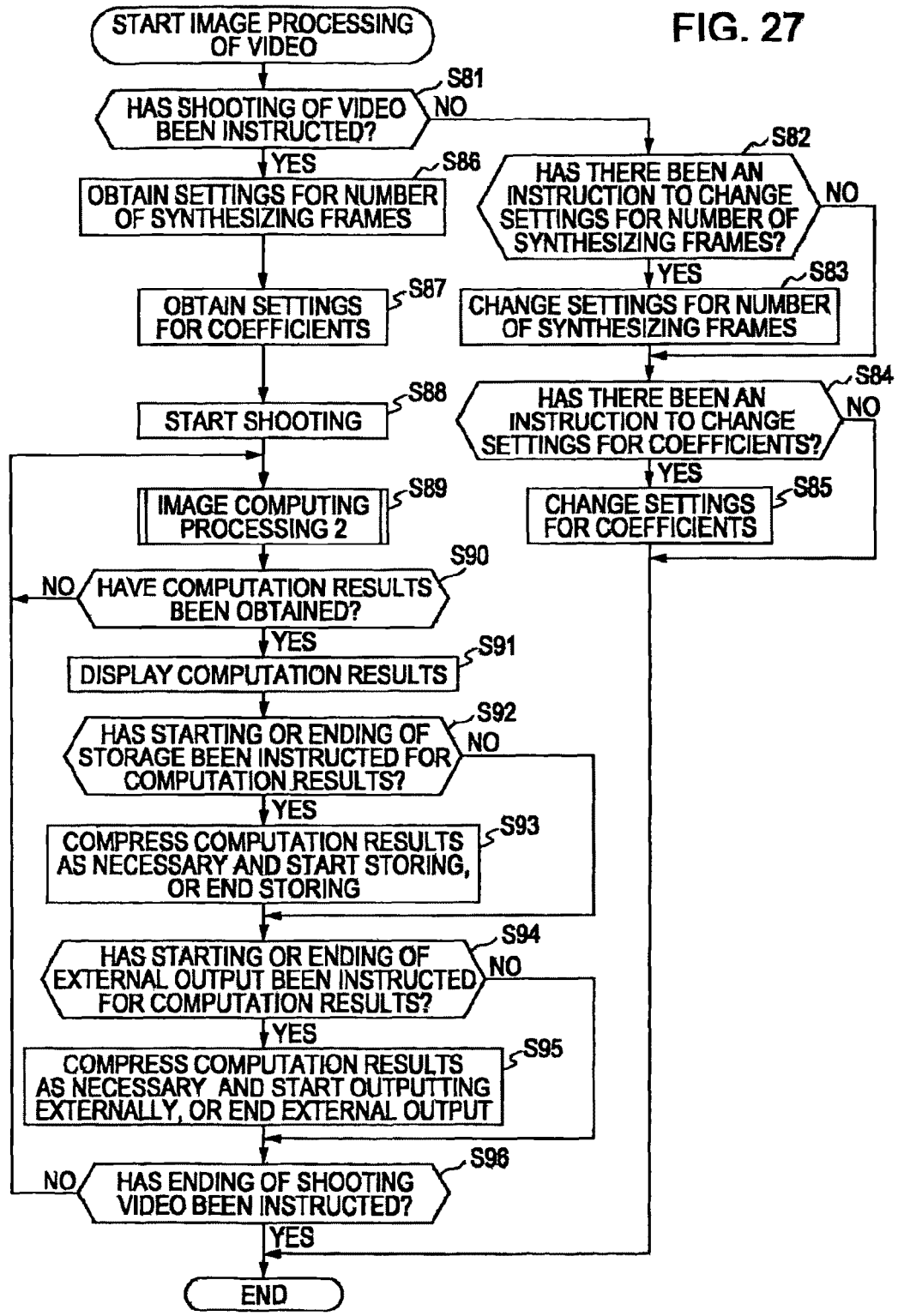
FIG. 27 is a flowchart for describing image-taking processing of a moving image.

In step S128, the adding unit 234 outputs the addition processing results, the flow returns to step S89 in FIG. 27, and proceeds to step S90.

Due to such processing, with the case of taking video images as well, temporarily storing multiple continuous taken images taken which have a distorted subject owing to focal plane shutter effects, and multiplying predetermined coefficients as necessary on the taken images, generates image data frames used for generating a corrected image as described with FIGS. 17A through 17C for example, and synthesizing these yields corrected image data frames making up the video images, wherein subject distortion occurring due to focal plane shutter effects appears to have been corrected, as described with reference to FIG. 18, for example.

Now, with the case of video images as well, the greater the number of images that are synthesized in a case of generating corrected image data frames making up the video images, the more corrected the distortion of the subjected in the image data generated by synthesizing appears. However, the greater the number of images that are synthesized, there is so-called blurring in images of moving subjects (or subjects which appear to move in the screen due to the camera moving). This blurring can be suppressed well by raising the frame rate as much as possible when taking the images to be synthesized. For example, the blurring occurring in a corrected image obtained in a case of using three image data frames taken at a frame rate three times the shutter speed of a normal digital still camera and performing synthesizing processing is approximately equivalent to the blurring occurring in a normal digital still camera.

Note that while FIGS. 27 and 28 describe the processing executed in the moving image photography camera 251 described with FIG. 24, processing performed in the image processing device 201 described with FIG. 23 is basically the same processing as the Image Computation Processing 2 described with FIG. 28.

As described above, distortion occurring in an image of a moving subject (or a subject moving within the screen due to the camera moving) that has been taken by an image-taking device (in many cases, a solid-state imaging device wherein pixels having photoelectric conversion function are disposed in an array, e.g., an XY address-type imaging device) wherein focal plane shutter effects occur, such as with a camera having a built-in CMOS image sensor for example, can be corrected with a simple configuration, thereby providing good images and video which are more agreeable to view, i.e., which are not unnaturally distorted.

Also, which the processing described is processing for a case wherein focal plane shutter effects occur due to the exposure start point-in-time differ among the rows in a taken image, it is needless to say that the present invention is restricted to such an arrangement, and that the present invention is applicable to, for example, cases wherein focal plane shutter effects occur due to the exposure start point-in-time differ among the columns in a taken image.

Also, in cases wherein the exposure start point-in-time does not differ according to rows or columns, but differs according to blocks of predetermined numbers of pixels, or differs for all pixels, for example, it is needless to say that advantages like those described above can be obtained by arrangements wherein, of multiple image data frames to be synthesized, multiplication processing is performed using coefficients such that of the image data taken at the earliest point-in-time or a relatively early point-in-time, pixels exposed at an early point-in-time are weighted less, and pixels exposed at a later point-in-time (e.g., pixels of the last row) are weighted more, while multiplication processing is performed using coefficients such that of the image data taken at the latest point-in-time or a relatively late point-in-time, pixels exposed at an early point-in-time are weighted more, and pixels exposed at a later point-in-time are weighted less.

The above-described series of processing can be executed by hardware, or by software. In this case, the above-described processing is executed by a personal computer 500 such as shown in FIG. 29.

Figure 29:
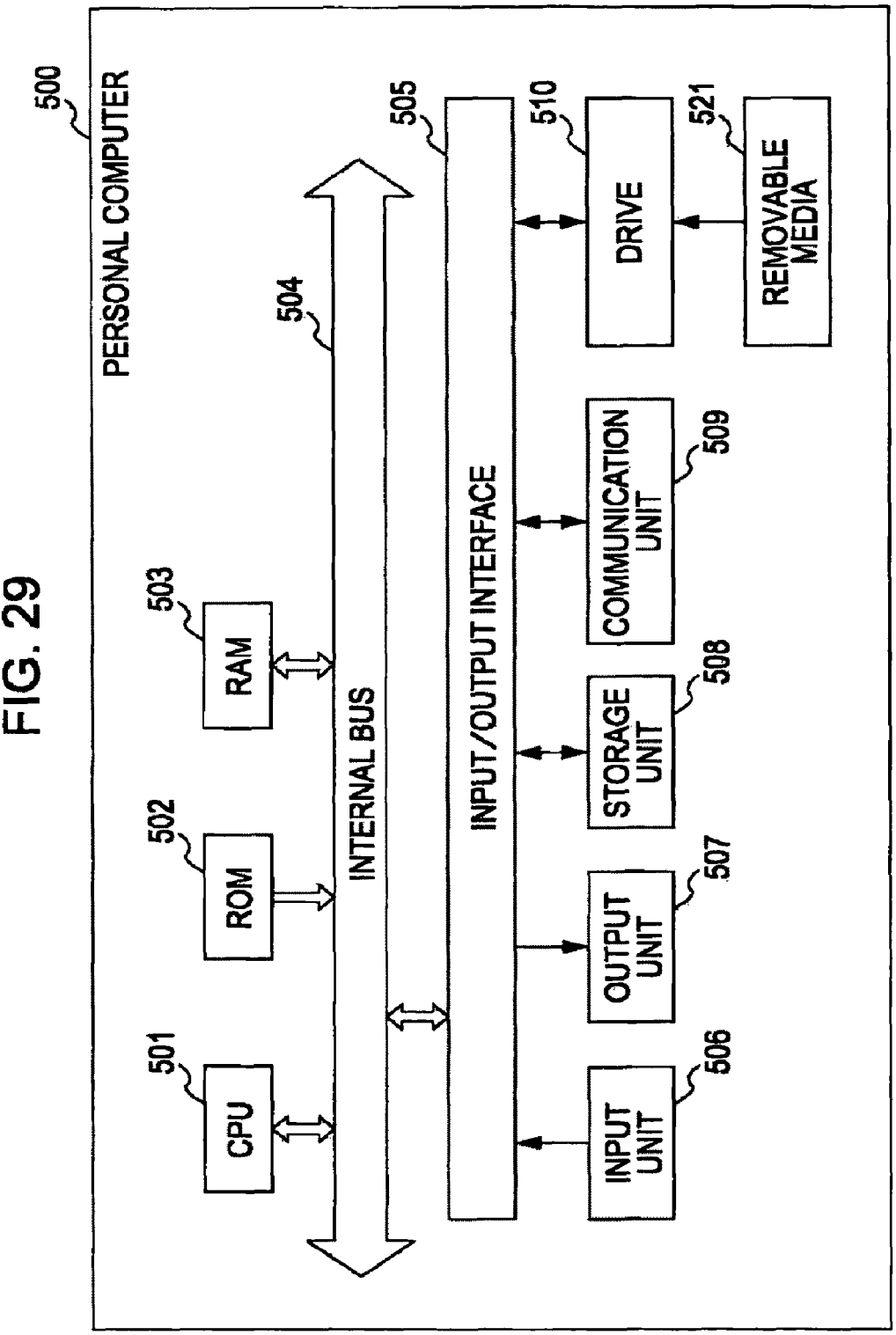
FIG. 29 is a block diagram illustrating the configuration of a personal computer.

In FIG. 29, a CPU (Central Processing Unit) 501 executes various types of processing following programs stored in ROM (Read Only Memory) 502 or programs loaded to RAM (Random Access Memory) 503 from a storage unit 508. The RAM 503 also stores as suitable any data necessary for the CPU 501 to execute the various types of processing.

The CPU 501, ROM 502, and RAM 503 are mutually connected via an internal bus 504. An input/output interface 505 is also connected to this internal bus 504.

Connected to the input/output interface 505 are an input unit 506 made up of a keyboard, mouse, etc., an output unit 507 made up of a display such as a CRT or LCD or the like, a speaker, etc., a storage unit 508 formed of a hard disk or the like, and a communication unit 509 made up of a modem, terminal adapter, etc. The communication unit 509 performs communication processing via various types of networks, including telephone lines, cable TV lines, and so forth.

The input/output interface 505 is also connected to a drive 510 as necessary, where removable media 521 such as a magnetic disk, optical disc, magneto-optical disc, semiconductor memory, or the like, as mounted as suitable, with a computer program read out therefrom being installed to the storage unit 508 as necessary.

In the event of executing the series of processing by software, a program making up that software is installed from a network or recording medium.

The recording medium is not restricted to packaged media configured of the removable media 521 in which the program is recorded, which is distributed separately from the computer so as to provide the user with the program, as shown in FIG. 29, but also includes cases wherein the program is already recorded in ROM 502 or a storage unit 508 which may include hard disk, and provided to the user in a state of being included in the device.

Also, with the present specification, the steps described in the program recorded in the recording medium may of course be executed in the time-sequence in which they are described, and also may be executed in parallel or individually rather than in time-sequence.

Note that in the present specification, the term "system" represents overall equipment made up of multiple devices.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device, comprising:
    an image acquisition section configured to acquire a plurality of image data sets corresponding to a plurality of images taken at continuous exposure timings;
    a coefficient storage section configured to store coefficients;
    a multiplying section configured to multiply pixel values of pixels of the first image in the plurality of images by corresponding different coefficients stored in the coefficient storage section, wherein the coefficients decrease gradually as a height of a corresponding pixel increases; and
    an adding section configured to add each pixel value of a predetermined number of the image data sets.

2. An image processing method, comprising:
    acquiring a plurality of image data sets corresponding to a plurality of images taken at continuous exposure timings;
    multiplying pixel values of pixels of the first image in the plurality of images by corresponding different coefficients, wherein the coefficients decrease gradually as a height of a corresponding pixel increases; and
    adding each pixel value of a predetermined number of the image data sets.

3. A non-transitory recording media tangibly storing a program for causing a computer to execute processing of:
    acquiring a plurality of image data sets corresponding to a plurality of images taken at continuous exposure timings;
    multiplying pixel values of pixels of the first image in the plurality of images by corresponding different coefficients, wherein the coefficients decrease gradually as a height of a corresponding pixel increases; and
    adding each pixel value of a predetermined number of the image data sets.

4. The image processing device according to claim 1, wherein:
    the coefficients are first coefficients; and
    the multiplying section is configured to multiply pixel values of pixels of a second image in the plurality of images by corresponding second coefficients, wherein the second coefficients increase gradually as a height of a corresponding pixel decreases.

5. The image processing device according to claim 4, wherein:
    the plurality of images include a third image between the first image and second image; and
    the multiplying section is configured to perform no multiplication to the third image.

* * * * *